ID9813096B2

United States Patent
Ido et al.

(10) Patent No.: US 9,813,096 B2
(45) Date of Patent: Nov. 7, 2017

(54) PLAYBACK OF VISUAL OR AUDIO CONTENT RELATED TO A CAPTURED IMAGE

(71) Applicant: TOSHIBA MEMORY CORPORATION, Tokyo (JP)

(72) Inventors: Michio Ido, Yokohama Kanagawa (JP); Keisuke Sato, Yokohama Kanagawa (JP); Shigeto Endo, Kamakura Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/425,110

(22) Filed: Feb. 6, 2017

(65) Prior Publication Data

US 2017/0230069 A1    Aug. 10, 2017

(30) Foreign Application Priority Data

Feb. 9, 2016 (JP) .................................. 2016-023089

(51) Int. Cl.
*H04B 1/034* (2006.01)
*H04B 1/3827* (2015.01)
(Continued)

(52) U.S. Cl.
CPC ............ *H04B 1/385* (2013.01); *H04W 4/008* (2013.01); *H04W 88/04* (2013.01)

(58) Field of Classification Search
CPC ....... H04B 1/385; H04W 4/008; H04W 88/04
(Continued)

(56) References Cited

U.S. PATENT DOCUMENTS 6,956,599 B2 * 10/2005 Lim ...................... H04N 7/185
                                                     348/14.02
7,250,867 B2    7/2007 Sakama et al.
(Continued)

FOREIGN PATENT DOCUMENTS

JP      2005-210676 A    8/2005
JP         4667397 B2    4/2011
(Continued)

*Primary Examiner* — Sanh Phu
(74) *Attorney, Agent, or Firm* — Patterson & Sheridan, LLP

(57) ABSTRACT

A wireless communication system includes a storage apparatus and a computing device. The storage apparatus includes a connector, a wireless antenna, a nonvolatile first memory having stored therein visual or audio content, a communication controller powered from an induction current generated when a wireless signal is received through the wireless antenna, and a controller powered using the power supplied from the electronic apparatus through the connector. The controller retrieves the visual or audio content from the first memory based on content ID transmitted wirelessly from the computing device and transmits the retrieved visual or audio content to the electronic apparatus for playback by the electronic apparatus. The computing device includes an image capturing unit, extracts feature values from the data of the captured image, and transmits the wireless signal containing the content ID to the storage apparatus, the content ID being determined from the extracted feature values.

20 Claims, 13 Drawing Sheets

(51) Int. Cl.
*H04W 4/00* (2009.01)
*H04W 88/04* (2009.01)

(58) Field of Classification Search
USPC .......................................................... 455/95
See application file for complete search history.

(56) References Cited

U.S. PATENT DOCUMENTS

| | | | |
|---|---|---|---|
| 7,460,170 B2 * | 12/2008 | Gardiner | H04N 5/2252 235/462.11 |
| 7,482,934 B2 | 1/2009 | Nakamura et al. | |
| 9,269,038 B2 | 2/2016 | Ikemoto et al. | |
| 2002/0013161 A1 * | 1/2002 | Schaeffer | H04M 1/0262 455/557 |
| 2007/0252706 A1 | 11/2007 | Furutani | |
| 2008/0309775 A1 * | 12/2008 | Mutsuro | H04N 5/232 348/220.1 |
| 2014/0226293 A1 | 8/2014 | Sato | |
| 2014/0246504 A1 | 9/2014 | Ikemoto et al. | |
| 2016/0321011 A1 * | 11/2016 | Sato | G06F 3/0659 |
| 2017/0010811 A1 * | 1/2017 | Sato | G06Q 30/02 |
| 2017/0091123 A1 * | 3/2017 | Sato | G06F 12/1416 |
| 2017/0099565 A1 * | 4/2017 | Sato | H04B 5/0031 |
| 2017/0099646 A1 * | 4/2017 | Ido | H04W 60/04 |

FOREIGN PATENT DOCUMENTS

| | | |
|---|---|---|
| JP | 2014-154777 A | 8/2014 |
| WO | 2006075359 A1 | 7/2006 |

\* cited by examiner

FIG. 3

| FEATURE ID (e1) | CONTENT ID (e2) |
|---|---|
| FEATURE A | CONTENT C10 |
| FEATURE B | CONTENT C20 |
| FEATURE C | CONTENT C30 |
| ⋮ | ⋮ |

| FEATURE ID (e1) | LOCATION DATA (e3) | CONTENT ID (e2) |
|---|---|---|
| FEATURE A | LOCATION α | CONTENT C10 |
| | LOCATION β | CONTENT C11 |
| | LOCATION γ | CONTENT C12 |
| | ⋮ | ⋮ |
| FEATURE B | LOCATION α | CONTENT C20 |
| | LOCATION β | CONTENT C21 |
| | LOCATION γ | CONTENT C22 |
| | ⋮ | ⋮ |
| FEATURE C | LOCATION α | CONTENT C30 |
| | LOCATION β | CONTENT C31 |
| | LOCATION γ | CONTENT C32 |
| | ⋮ | ⋮ |
| ⋮ | ⋮ | ⋮ |

T2

PLAYBACK OF VISUAL OR AUDIO CONTENT RELATED TO A CAPTURED IMAGE

CROSS-REFERENCE TO RELATED APPLICATION

This application is based upon and claims the benefit of priority from Japanese Patent Application No. 2016-023089, filed Feb. 9, 2016, the entire contents of which are incorporated herein by reference.

FIELD

Embodiments described herein relate generally to an information processing system.

BACKGROUND

A storage apparatus of one type is capable of performing wireless communication. An information processing apparatus capable of performing wireless communication can store data in the storage apparatus or to read data stored in the storage apparatus, by performing wireless communication with the storage apparatus.

DESCRIPTION OF THE DRAWINGS

FIG. 3 illustrates a first example of a content-related table according to the first embodiment.

FIG. 4 illustrates a second example of a content-related table according to the first embodiment.

DETAILED DESCRIPTION

Figure 1:
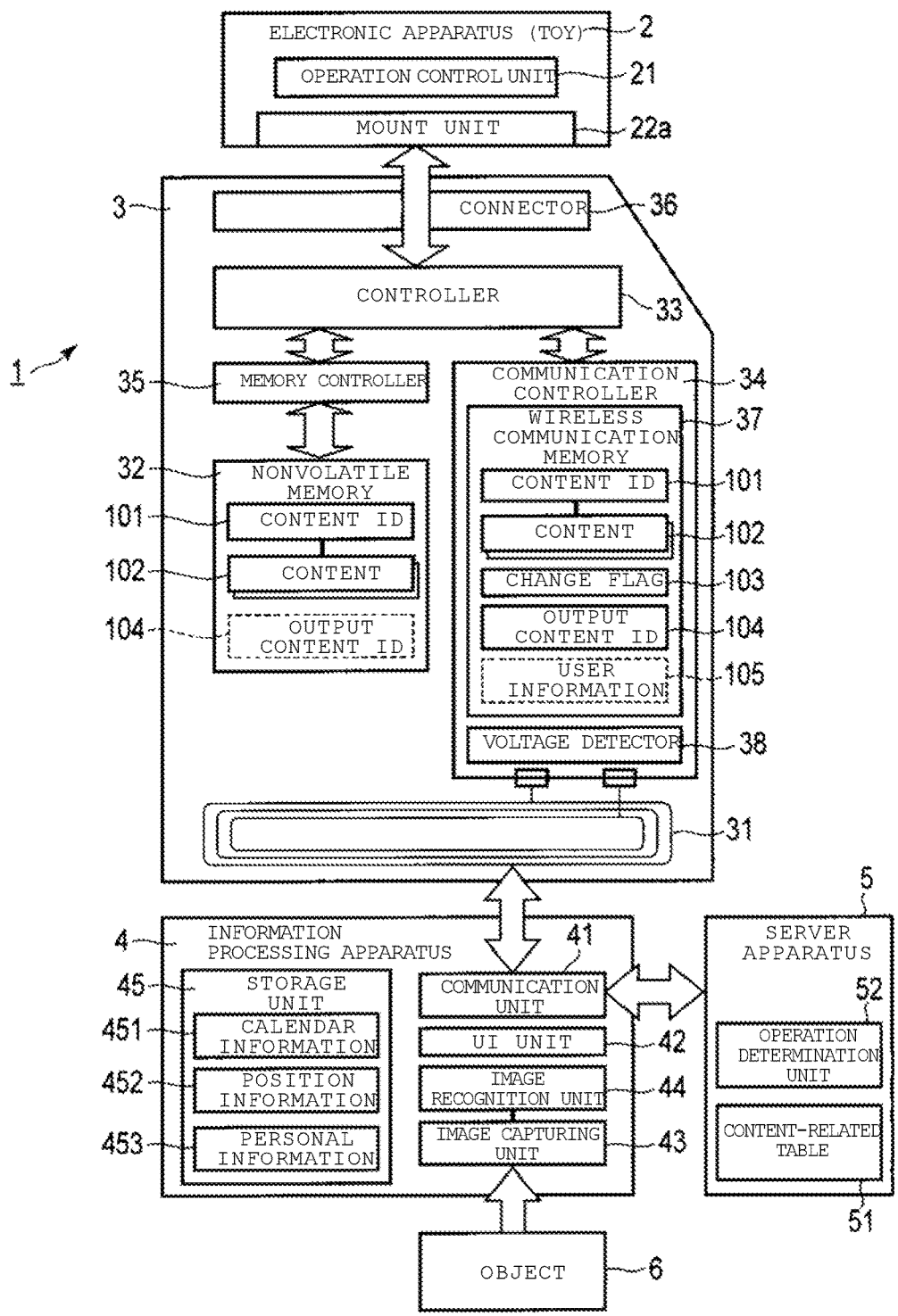
FIG. 1 is a block diagram of an information processing system according to a first embodiment.

Embodiments provide an information processing system, in which setting information corresponding to an image processing result that is obtained by an information processing apparatus is stored in a storage apparatus capable of performing wireless communication, and an external apparatus can read the setting information which is stored in the storage apparatus.

In general, according to an embodiment, a wireless communication system includes a storage apparatus and a computing device. The storage apparatus includes a connector through which the storage apparatus communicates with an electronic apparatus and receives power from the electronic apparatus, a wireless antenna through which the storage apparatus communicates with the computing device, a nonvolatile first memory having stored therein visual or audio content to be output through the electronic apparatus when the connector is electrically coupled to the electronic apparatus, each item of the visual or audio content being associated with a content ID, a communication controller that is powered from an induction current generated when a wireless signal is received through the wireless antenna, the communication controller including a second memory in which the communication controller stores a content ID transmitted from the computing device via the wireless signal, and a controller that is powered using the power supplied from the electronic apparatus through the connector when the connector is electrically coupled to the electronic apparatus, wherein the controller is configured to retrieve the visual or audio content from the first memory based on the content ID transmitted from the computing device and transmits the retrieved visual or audio content to the electronic apparatus through the connector for playback by the electronic apparatus. The computing device includes an image capturing unit and is configured to extract a set of feature values from data of an image captured by the image capturing unit and transmit the wireless signal containing the content ID to the storage apparatus, the content ID being determined based on the extracted set of feature values and geographical or temporal information relating to the computing device.

Hereinafter, respective embodiments will be described with reference to the drawings. In the following description, approximately or substantially the same functions and components are denoted by the same reference numerals, and a description will be given as necessary.

First Embodiment

A first embodiment describes an electronic apparatus on which a storage apparatus capable of performing wireless communication (hereinafter, referred to as a wireless storage apparatus) is detachably mountable, a wireless storage apparatus which is detachably mountable on the electronic apparatus, an information processing apparatus capable of communicating with the wireless storage apparatus, and an information processing system including the electronic apparatus, the wireless storage apparatus, and the information processing apparatus. In the present embodiment, identification information is referred to as ID.

In the present embodiment, the information processing apparatus executes image processing, and sends setting information corresponding to image processing result, to the wireless storage apparatus through the wireless communication. For example, when the information processing system according to the present embodiment extracts the setting information of the electronic apparatus from an image captured by the information processing apparatus and sends the setting information of the electronic apparatus from the information processing apparatus to the wireless storage apparatus, the setting of the electronic apparatus is changed (for example, stored or updated). The present embodiment describes the change of content that is output (for example, reproduction) from the electronic apparatus, more specifically, the change of audio data that is output from the electronic apparatus, as an example of the change of the setting of the electronic apparatus. However, the change of the setting of the electronic apparatus may include the change of various operations based on the setting information that is stored in the wireless storage apparatus.

In the present embodiment, image recognition will be described as an example of the image processing. However, the image processing may include a variety of processing such as image analysis, processing, data compression, data decoding, filtering, feature extraction, or code recognition of a bar code or a two-dimensional code.

The present embodiment describes a case where setting information of the electronic apparatus is obtained by the image processing of the information processing apparatus as an example. However, other pieces of information or data which are used in the electronic apparatus may be obtained through image processing of the information processing apparatus.

FIG. 1 is a block diagram of an information processing system according to the present embodiment.

An information processing system 1 includes an electronic apparatus (host device) 2, a wireless storage apparatus 3, an information processing apparatus 4, and a server apparatus 5. The information processing apparatus 4 captures an image of an object 6.

The electronic apparatus (host device) 2 may be, for example, toys, smart watches, game machine, mobile phones, computers, wearable terminals or the like. In the present embodiment, the electronic apparatus 2 is a toy. For example, the electronic apparatus 2 may be a watch-type toy.

The electronic apparatus 2 includes a mount unit 22a in which the wireless storage apparatus 3 is detachably mountable.

The user can insert the wireless storage apparatus 3 into the mount unit 22a, and remove (for example, draw) the wireless storage apparatus 3 from the mount unit 22a.

When the wireless storage apparatus 3 is mounted in the mount unit 22a, the electronic apparatus 2 is electrically connected to the wireless storage apparatus 3, and can transmit and receive commands, addresses, data, information, instructions, signals, and the like to and from the wireless storage apparatus 3.

An electronic apparatus ID may be assigned to the electronic apparatus 2. The electronic apparatus ID may be an ID specific to the electronic apparatus 2, or an ID indicating the type (for example, the version, or the like) of the electronic apparatus 2. The electronic apparatus 2 manages the electronic apparatus ID, and the electronic apparatus 2 may transmit the electronic apparatus ID to the wireless storage apparatus 3.

The electronic apparatus 2 executes an operation corresponding to data stored in the wireless storage apparatus 3. For example, the electronic apparatus 2 outputs content stored in the wireless storage apparatus 3, or changes the setting of the electronic apparatus 2, in response to the operation by the user.

Examples of the operation by the user include the power ON or the power OFF of the electronic apparatus 2, or the press of an operation button.

The content may be image data (still image data, and moving image data), audio data (music data, voice data, and the like), video data, and the like. The content may represent a character. In the present embodiment the content is audio data and the content ID is setting information, as an example.

The electronic apparatus 2 can access the wireless storage apparatus 3 by polling or in response to the operation by the user, recognize the change of setting information, and output content based on the changed setting information.

The electronic apparatus 2 can read the changed content which is stored in a predetermined memory area of the wireless storage apparatus 3, and output the changed content.

The electronic apparatus 2 can read the changed content which is stored in a predetermined memory area of the wireless storage apparatus 3, and store the changed content in a predetermined memory area of the electronic apparatus 2.

The electronic apparatus 2 includes an operation control unit 21.

The operation control unit 21 recognizes the content ID of the content to be output, for example, based on the information stored in the wireless storage apparatus 3, reads the content correlated with the recognized content ID from the wireless storage apparatus 3, and outputs the read content. Further, the operation control unit 21 determines content to be output, for example, based on the information stored in the wireless storage apparatus 3. In addition, the content ID may be an identification number unique to the content, or a storage destination address of the content.

The wireless storage apparatus 3 may be, for example, various storage apparatuses such as a memory card (an SD memory card, a multimedia card, or the like), a universal serial bus (USB) memory, and a storage apparatus. In the present embodiment, the wireless storage apparatus 3 is a memory card.

In the present embodiment, the wireless storage apparatus 3 performs, for example, wireless communication conforming to a near field communication (NFC), which is a short-range wireless communication standard at a frequency of 13.56 MHz or the like.

If the wireless storage apparatus 3 is mounted in the electronic apparatus 2, the wireless storage apparatus 3 is electrically connected to the electronic apparatus 2, and is supplied with power from the electronic apparatus 2. The wireless storage apparatus 3 stores data received from the electronic apparatus 2, reads the data stored in various memories of the wireless storage apparatus 3, and transmits the read data to the electronic apparatus 2. The wireless storage apparatus 3 can communicate data using power generated (induced) by electromagnetic induction of the wireless antenna 31 even if power is not supplied from the electronic apparatus 2. In other words, the wireless storage apparatus 3 can perform, for example, wireless communication, and transmits or receives data to or from the information processing apparatus 4. In the wireless storage apparatus 3, at least some components are operable using the power generated by electromagnetic induction based on radio waves from the information processing apparatus 4, even if power is not supplied from the electronic apparatus 2.

Although the wireless storage apparatus 3 transmits and receives data to and from the electronic apparatus 2 according to a wired interface such as, for example, an SD interface in the present embodiment, other interfaces may be used. Further, although the wireless storage apparatus 3 transmits and receives data to and from the information processing apparatus 4 by using, for example, an NFC interface, other wireless communication interfaces may be used.

The wireless storage apparatus 3 includes a wireless antenna 31, a nonvolatile memory 32, a controller 33, a communication controller 34, a memory controller 35, and a connector 36. The communication controller 34 includes a wireless communication memory 37 and a voltage detector 38. The communication controller 34 and the wireless communication memory 37 may be configured separately. It is possible to freely combine or separate the controller 33, the communication controller 34, and the memory controller 35.

The controller 33, the memory controller 35, and the nonvolatile memory 32 operate, for example, when the wireless storage apparatus 3 receives power from the electronic apparatus 2. When the wireless storage apparatus 3 receives power only through the wireless antenna 31, and does not receive power from the electronic apparatus 2, the controller 33, the memory controller 35, and the nonvolatile memory 32 may not necessarily operate. Meanwhile, the communication controller 34 is operable, even if the wireless storage apparatus 3 receives power only through the wireless antenna 31, and not from the electronic apparatus 2. In other words, if the wireless antenna 31 receives wireless radio waves of a predetermined frequency corresponding to the NFC, the communication controller 34 is operable, and the wireless storage apparatus 3 can perform communication by the NFC. The controller 33, the memory controller 35, and the nonvolatile memory 32 may be operable using power supplied from the wireless antenna 31, even if the wireless storage apparatus 3 receives power only through the wireless antenna 31, and not from the electronic apparatus 2.

The nonvolatile memory 32 may be, for example, a nonvolatile semiconductor memory. The nonvolatile memory 32 is, for example, a NAND-type flash memory, but may be another non-volatile semiconductor memory such as a NOR-type flash memory, a magnetoresistive random access memory (MRAM: a magnetoresistive memory), a phase-change random access memory (PRAM: a phase-change memory), a resistive random access memory (ReRAM: a resistance-change memory), and a ferroelectric random access memory (FeRAM). For example, the nonvolatile memory 32 may be another nonvolatile memory, a magnetic memory, or the like. For example, the nonvolatile memory 32 may be a flash memory of a three-dimensional structure.

The nonvolatile memory 32 operates, for example, when the electronic apparatus 2 supplies power to the wireless storage apparatus 3.

In the present embodiment, the nonvolatile memory 32 stores, for example, a content ID 101 indicating content to be output, and various contents 102 which are output by the electronic apparatus 2. In the present embodiment, the various contents 102 are associated with the content IDs 101, and may be readable based on the content IDs 101. The various contents 102 are stored in a predetermined memory area, and may be readable based on an address indicating the predetermined memory area.

The nonvolatile memory 32 may manage the content ID 101 and the content 102, for example, by dividing the memory area into memory areas for respective electronic apparatus IDs.

The controller 33 receives the commands, the addresses, the data, the information, the instructions, the signals, or the like, from the electronic apparatus 2, the memory controller 35, and the communication controller 34.

The controller 33 outputs the commands, the addresses, the data, the information, the instructions, the signals, or the like, to the memory controller 35, the communication controller 34, and the electronic apparatus 2, based on the received command.

In the present embodiment, the controller 33 may operate, based on software such as firmware, an operating system, and an application program.

The controller 33 stores the content ID 101 and the content 102, in the nonvolatile memory 32.

The controller 33 performs, for example, mirroring such that the nonvolatile memory 32 and the wireless communication memory 37 store the same contents as each other.

For example, when new data to be mirrored is stored or data to be mirrored is changed in one of the nonvolatile memory 32 and the wireless communication memory 37, the controller 33 stores the new data to be mirrored or changes the data to be mirrored which is in the other memory to have the same contents as the data to be mirrored stored in one memory, by the mirroring. In the present embodiment, examples of data to be the same in the nonvolatile memory 32 and the wireless communication memory 37, that is, the data to be mirrored include the content ID 101, the content 102, and the like. In addition, an output content ID 104 (described below) may be included in the data to be mirrored. The data to be mirrored is not limited thereto.

The controller 33 performs the mirroring, in a state where the wireless storage apparatus 3 receives power, for example, in a state where the user mounts the wireless storage apparatus 3 in the electronic apparatus 2. When the wireless storage apparatus 3 start receiving power, the controller 8 may perform the mirroring. Accordingly, since the mirroring is performed immediately after turning on the power of the electronic apparatus 2, the electronic apparatus 2 can reflect the change in the wireless communication memory 37 during the power off of the electronic apparatus 2 in the nonvolatile memory 32 without omission. Even when the electronic apparatus 2 does not supply power to the wireless storage apparatus 3, the wireless storage apparatus 3 receives data from the information processing apparatus 4, such that the controller 33 may execute, for example, a process such as the mirroring.

The timing of the mirroring is not limited to the time of the power supply to the wireless storage apparatus 3. For example, the mirroring may be performed when the wireless storage apparatus 3 receives a wireless communication instruction from the information processing apparatus 4, may be performed at the timing of power OFF of the wireless storage apparatus 3, or may be performed each time a predetermined time elapses.

The controller 33 may compress data to be stored in the wireless communication memory 37. The controller 33 executes the compression, by using, for example, the Huffman code. When reading the data stored in the wireless communication memory 37, the controller 33 decompresses the compressed data, reads out the decompressed data, and outputs the data as read data. The controller 33 may perform compression and decompression of data. Alternatively, the wireless storage apparatus 3 may have a compressor and a decompressor, and the controller 33 may control the compressor to compress data and the decompressor to decompress data.

The memory controller 35 controls the nonvolatile memory 32. The memory controller 35 stores data in the nonvolatile memory 32, for example, based on the commands or the like which are input from the controller 33. The memory controller 35 reads data from the nonvolatile memory 32 and outputs the data to the controller 33, for example, based on the commands or the like which are input from the controller 33. The memory controller 35 may communicate with the communication controller 34 or the electronic apparatus 2, without passing through the controller 33.

The wireless antenna 31 is, for example, a PCB pattern antenna. The operable frequency band of the wireless antenna 31 may be a predetermined frequency band corresponding to the NFC.

The wireless antenna 31 can generate power by electromagnetic induction, based on, for example, the radio waves from the information processing apparatus 4. The wireless antenna 31 supplies the generated power to the communication controller 34.

The wireless antenna 31 receives commands, addresses, data, information, instructions, signals, or the like, from the information processing apparatus 4. The wireless antenna outputs the received commands, and the like, to the communication controller 34.

The communication controller 34 performs communication with the information processing apparatus 4 and the like through the wireless antenna 31. The communication controller receives commands, addresses, data, information, instructions, signals, or the like from the controller 33 and the wireless antenna 31. The communication controller 34 outputs, for example, data and the like, to the controller 33 and the wireless antenna 31, based on the received command. The communication controller 34 reads data from the wireless communication memory 37, based on the received command, address, and the like, and outputs the read data to the controller 33 and the wireless antenna 31. The communication controller 34 stores data in the wireless communication memory 37, based on the received command, address, and the like.

The commands, the addresses, the data, the information, the instructions, the signals, or the like, which are communicated among the electronic apparatus 2, the controller 33, the memory controller 35, the communication controller 34, the wireless antenna 31, and the like, need not to be in the same data format. As long as both communication parties can recognize commands, addresses, data, information, instructions, signals, or the like, there is no need to match the commands, addresses, data, information, instructions, signals, or the like, in their formats, when the communication parties are communicated by other parties.

When receiving commands and data through the controller 33 or the wireless antenna 31, the communication controller 34 stores data in the wireless communication memory 37. The communication controller 34 may not necessarily perform the writing of data into the wireless communication memory 37.

The wireless communication memory 37 is, for example, a nonvolatile memory. The wireless communication memory 37 stores data under the control of the communication controller 34 or the memory controller 35. Incidentally, data storage in the wireless communication memory 37 may be temporary. For example, although an electrically erasable programmable read-only memory (EEPROM) is used as the wireless communication memory 37, it is possible to use various types of memory similarly to the nonvolatile memory 32.

Since the nonvolatile memory used in the wireless communication memory 37 is operable at the power supplied from the wireless antenna 31, it is desirable that the nonvolatile memory has lower power consumption per unit volume than that of the nonvolatile memory 32. Specifically, a NOR-type memory may be used.

In the present embodiment, the wireless communication memory 37 stores a part or all of the data which is stored in the nonvolatile memory 32. For example, the wireless communication memory 37 stores a content ID 101, a content 102, a change flag 103, an output content ID 104, and user information 105.

The change flag 103 (change information) is, for example, a flag indicating whether or not there is a change (update) in the content ID 101 or the content 102.

The state of the change flag 103 is changed by the communication controller 34. If there is a change in the content ID 101 or the content 102, the communication controller 34 changes the change flag 103 to be On, and if there is no change in the content ID 101 or the content 102, it changes the change flag 103 to be Off. Incidentally, the communication controller 34 may change the state of the change flag 103, based on an instruction of the information processing apparatus 4.

If the change flag 103 is Off, it is indicated that mirroring between the wireless communication memory 37 and the nonvolatile memory 32 is not required. In other words, the controller 33 may determine whether or not to perform mirroring, with reference to the change flag 103, at a timing of implementing the mirroring between the wireless communication memory 37 and the nonvolatile memory 32.

The output content ID 104 is a content ID of content to be output (for example, sound output or image reproduction) by the electronic apparatus 2. If there is content to be currently output by the electronic apparatus 2, the output content ID 104 may be a content ID of the content to be output next to the content to be currently output. For example, the information processing apparatus 4 performs wireless communication with the wireless storage apparatus 3, and stores the output content ID 104 in the wireless communication memory 37 through the communication controller 34. When the wireless storage apparatus 3 is mounted, the electronic apparatus 2 may check the wireless communication memory 37 through the connector 36, the controller 33, and the communication controller 34 of the wireless storage apparatus 3. When the output content ID 104 is stored in the wireless communication memory 37, the electronic apparatus 2 may preferentially output the content designated in the output content ID 104 which is stored in the wireless communication memory 37. When the wireless storage apparatus 3 is mounted, and the output content ID 104 of the wireless communication memory 37 is stored in the nonvolatile memory 32 by mirroring, the electronic apparatus 2 may check the nonvolatile memory 32 through the connector 36, the controller 33, and the memory controller 35 of the wireless storage apparatus 3. When the output content ID 104 is stored in the nonvolatile memory 32, the electronic apparatus 2 may preferentially output the content designated in the output content ID 104 which is stored in the nonvolatile memory 32.

The user information 105 is various information which are acquired by the information processing apparatus 4, and may be, for example, the position information, the personal information, the time information of the information processing apparatus 4 (hereinafter, collectively referred to as user information), or the like. In addition, the time information may include, for example, information indicating the current date and time, calendar information, or the like.

In addition, in the present embodiment, the user information 105 may be omitted.

In the present embodiment, the communication controller 34 receives content to be added or a content ID to be changed, which is determined by the information processing apparatus 4, through the wireless antenna 31 from the information processing apparatus 4. The communication controller 34 stores the content to be added or the content ID to be changed in the wireless communication memory 37, as the content 102 to be output or the content ID 101 that designates the content to be output. The communication controller 34 changes the change flag 103 to be On. The controller 33 confirms that the change flag 103 is be On, and stores the changed content ID 101 in the nonvolatile memory 32 by mirroring.

In the present embodiment, the communication controller 34 receives the content ID of the content to be output by the electronic apparatus 2, which is determined by the information processing apparatus 4, from the information processing apparatus 4 through the wireless antenna 31. The communication controller 34 stores the received content ID in the wireless communication memory 37, as the output content ID 104, and changes the change flag 103 to be Off. The controller 33 confirms that the change flag 103 is Off, and does not perform mirroring. When the wireless storage apparatus 3 is mounted, the electronic apparatus 2 compares the content corresponding to the output content ID 104 with the content ID 101 of the nonvolatile memory 32 with reference to the output content ID 104, and outputs the content corresponding to the output content ID 104. As another example, the communication controller 34 may store the received content ID in the wireless communication memory 37 as the output content ID 104, and change the change flag 103 to be On. In this case, for example, the controller 33 confirms that the change flag 103 is On, and performs mirroring. If the wireless storage apparatus 3 is mounted, the electronic apparatus 2 may refer to the output content ID 104 which is stored in the nonvolatile memory 32 by mirroring, and output the content of the nonvolatile memory 32 corresponding to the output content ID 104.

The wireless communication memory 37 may store, for example, relevant data of the wireless storage apparatus 3 (a part of data stored in the nonvolatile memory 32 (for example, image data, audio data, video data, or the like), data relevant to the data stored in the nonvolatile memory 32, data relevant to the nonvolatile memory 32 and wireless storage apparatus 3), data relevant to the information processing apparatus 4, or commands which are received from the controller 33, the information processing apparatus 4, or the like.

The data stored in the wireless communication memory 37 will be described below with specific examples thereof. These are merely examples, and data stored in the wireless communication memory 37 is not limited thereto.

The data relevant to the image data among the data relevant to the data stored in the nonvolatile memory 32 is, for example, file name data, a first or last part of image data, thumbnail image data of image data, file generation time data, imaging time data, data ID, and the like.

The data relevant to the audio data among the data relevant to the data stored in the nonvolatile memory 32 is, for example, file name data, a first or last part of audio data, output time data of audio data, file generation time data, data ID, and the like.

The data relevant to the nonvolatile memory 32 is memory capacity data, remaining capacity data, data of the number of files, and the like of the nonvolatile memory 32.

The data related to the wireless storage apparatus 3 is recognition ID data (identification number which is arbitrarily assigned to each wireless storage apparatus 3, for example, a unique product ID assigned at the time of manufacture, or ID which is arbitrarily assigned later to each wireless storage apparatus 3), or comments (text data associated with the wireless storage apparatus 3, which is stored by the user in the wireless storage apparatus 3 through the electronic apparatus 2 or the information processing apparatus 4).

Data related to the electronic apparatus 2 is the electronic apparatus ID of the electronic apparatus 2, the version information of the electronic apparatus 2, the change information of firmware of the electronic apparatus 2, flag information generated based on these pieces of information, or the like.

The connector 36 is, for example, a standardized connection terminal, such as an SD interface, and is electrically connectable with the electronic apparatus 2. The connector 36 may be compliant with other standards that are different from the SD interface.

The voltage detector 38 is electrically connected to the wireless antenna 31. The voltage detector 38 detects the voltage supplied from the wireless antenna 31 to the communication controller 34. The voltage detector 38 continues to issue reset commands of communication by the NFC, until the voltage reaches a predetermined value at which the communication controller 34 is operable. The communication controller 34 does not perform communication by the NFC while receiving the reset command. This reset command prevents an abnormal activation and operation of communication by the NFC. When the voltage reaches the predetermined value, the voltage detector 38 may output an operational command to the communication controller 34. In this case, only when receiving the operational command, the communication controller 34 performs communication by the NFC.

The information processing apparatus 4 is, for example, mobile computing devices such as cellular phones and smart phones, or computers, game machines, station apparatuses, wearable terminals, or the like. The station apparatuses are, for example, devices which are arranged in shopping malls, electronics stores, toy stores, or the like, and can communicate with external devices. The information processing apparatus 4 can transmit and receive commands, addresses, data, information, instructions, signals, or the like to and from the wireless storage apparatus 3.

The information processing apparatus 4 includes, for example, a communication unit (wireless communication unit) 41, a user interface (UI) unit 42, an image capturing unit 43, an image recognition unit 44, which is an example of an image processing unit, and a storage unit 45.

The communication unit 41 performs wireless communication with the wireless storage apparatus 3 to transmit and receive commands, addresses, data, information, instructions, signals, or the like. The communication unit transmits and receives commands, addresses, data, information, instructions, signals, or the like to and from the server apparatus 5 in a wireless manner or wired manner. For example, the wireless communication standard such as a wireless LAN, a 3rd Generation (3G), or a long term evolution (LTE) may be used for the communication between the information processing apparatus 4 and the server apparatus 5.

The UI unit 42 is a user interface of the information processing apparatus 4, and may include, for example, input and output devices such as a display device such as a display, operation buttons, a touch panel, a printer, or a keyboard.

The image capturing unit 43 captures the image of the object 6, using an image acquisition device included in the information processing apparatus 4. The image acquisition device may be any device capable of capturing an image of the object 6, and may be, for example, cameras, scanners, sensors, readers, or the like. In the present embodiment, the image acquisition device is a camera, as an example. The object 6 is, for example, one of character goods having content attached therein which is an image recognition subject. As a more specific example, the object 6 is, for example, one of clothes having content such as a pattern and color printed thereon.

The image recognition unit 44 performs, for example, pattern recognition for the captured image. For example, the image recognition unit 44 extracts features (feature values), from image data of an image of the object 6 that was captured by the image capturing unit 43. The features may be an image itself, or may be an image pattern or feature points obtained by image analysis. For example, the features may be the pattern or color of character goods. For example, the image recognition unit 44 extracts features, by determining whether or not the features extracted from the imaging data of the object 6 includes (or matches) features which are registered in the image recognition unit 44, or includes features which are stored in the storage unit 45.

The storage unit 45 stores user information such as calendar information 451, position information 452, personal information 453, and the like.

The calendar information 451 is associated with date and an event that corresponds to the date. Examples of the event include annual events such as New Year, traditional end of winter, Doll's Festival, Children's Day, Christmas, New Year's Eve, or the like.

The position information 452 indicates a geographical position of the information processing apparatus 4, which is obtained by, for example, a global positioning system (GPS).

The personal information 453 includes information such as birthday, age, home address, and schedule of the user of the information processing apparatus 4 or the user of the electronic apparatus 2.

In the present embodiment, the communication unit 41 transmits the features of the imaging data obtained by the image recognition unit 44 and the user information stored in the storage unit 45, to the server apparatus 5. Further, the communication unit 41 receives the content ID or the content from the server apparatus 5. The communication unit 41 performs wireless communication with the wireless storage apparatus 3 so as to transmit the content ID, the content, various information stored in the storage unit 45, or the like, to the wireless storage apparatus 3.

The server apparatus 5 includes a content-related table 51 and an operation determination unit 52.

In the content-related table 51, for example, a feature ID of the feature of imaging data and user information are associated with the content ID of content.

The operation determination unit 52 determines, for example, a content ID to be changed, content to be added, or the content ID of content to be output next by the electronic apparatus 2, with reference to the content-related table 51 using the features and the user information which are received from the information processing apparatus 4. The operation determination unit 52 transmits the content information such as the determined content ID, to the information processing apparatus 4.

In addition, the server apparatus 5 may function as a service site that provides various services to each user.

Figure 2:
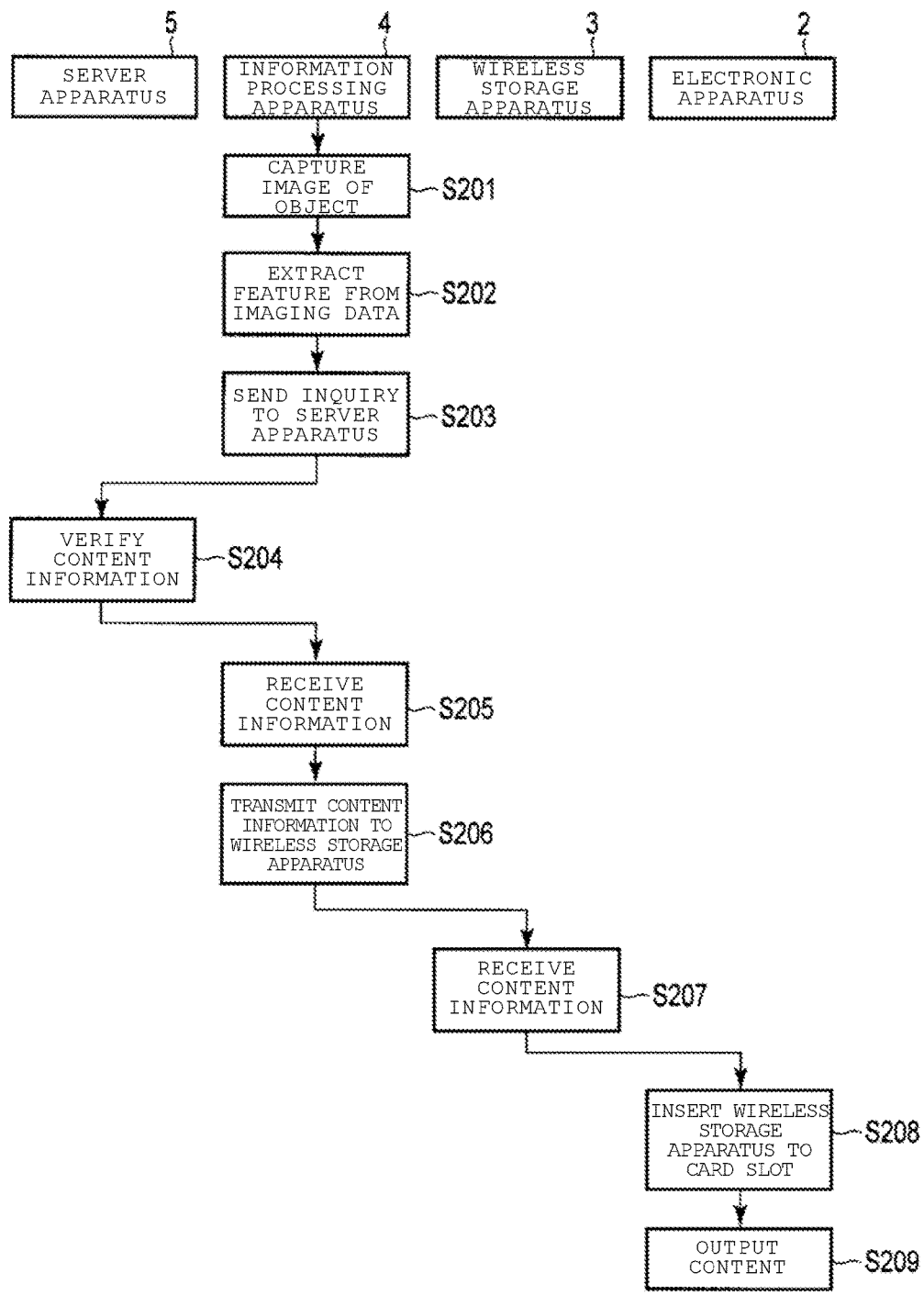
FIG. 2 is a flow chart of a process carried out by the information processing system according to the first embodiment.

FIG. 2 is a flow chart illustrating an example of the process of the information processing system 1 according to the present embodiment.

In step S201, the camera of the information processing apparatus 4 captures an image of the object 6, in response to the operation of the user, and the image capturing unit 43 generates imaging data.

In step S202, the image recognition unit 44 extracts features from the imaging data as necessary.

In step S203, the communication unit 41 transmits the features obtained based on the imaging data, and the user information (the calendar information 451, the position information 452, the personal information 453, or the like) stored in the storage unit 45, to the server apparatus 5. The user information may be generated in step S201, and stored in the storage unit 45. For example, a combination of a result of image processing on the imaging data (features obtained based on imaging data) and the user information may be defined as first setting information.

If the user information is not required depending on the form of the content-related table 51, the user information may not be transmitted to the server apparatus 5. The details of the content-related table 51 will be described below with reference to FIG. 3 and FIG. 4.

In step S204, the operation determination unit 52 of the server apparatus 5 receives a feature and user information from the information processing apparatus 4. The received feature is converted into a feature ID by the server apparatus 5. The operation determination unit 52 performs verification of the content information from the content-related table 51 using the feature ID and the user information to determine the content information. The content information may be, for example, the content ID to be changed, the content to be added, the content ID of content to be output next by the electronic apparatus 2, or a combination of two or more thereof.

In step S205, the communication unit 41 of the information processing apparatus 4 receives the content information from the server apparatus 5.

In step S206, the communication unit 41 performs wireless communication with the wireless storage apparatus 3 and transmits the content information to the wireless storage apparatus 3.

In step S207, the communication controller 34 of the wireless storage apparatus 3 receives the content information. The communication controller 34 stores the received content information as the content ID 101 when the content ID is to be changed, and stores the content information as the content ID 102 when content ID is to be added, in the wireless communication memory 37. The communication controller 34 changes the change flag 103 to be On. The controller 33 confirms that the change flag 103 is On, and stores the changed content ID 101 in the nonvolatile memory 32 by mirroring.

If the content information is the content ID of content to be output by the electronic apparatus 2, the communication controller 34 of the wireless storage apparatus 3 stores the content ID of the content to be output as the output content ID 104, in the wireless communication memory 37.

In step S208, the wireless storage apparatus 3 is connected to the electronic apparatus 2 in accordance with the user's operation. Here, the user may mount the wireless storage apparatus 3 in the electronic apparatus 2. By mounting, power is supplied to the controller 33, the memory controller 35, and the nonvolatile memory 32 of the wireless storage apparatus 3, through the connector 36 from the electronic apparatus 2. The electronic apparatus 2 recognizes the wireless storage apparatus 3.

In step S209, the electronic apparatus 2 refers to the output content ID 104, and if the output content ID 104 is written, the electronic apparatus 2 verifies the content corresponding to the output content ID 104 with the content ID 101 in the nonvolatile memory 32, and outputs the content corresponding to the output content ID 104. The timing of outputting the content may be at the time of mounting, or it may be at any timing rather than the time of mounting. Further, the output content ID 104 may be stored in the nonvolatile memory 32 by mirroring. In this case, the electronic apparatus 2 reads the output content ID 104 of the nonvolatile memory 32 through the connector 36, the controller 33, and the memory controller 35. The electronic apparatus 2 recognizes the content ID 101 corresponding to the output content ID 104, and outputs the content corresponding to the read content ID 101 through the memory controller 35 and the controller 33.

If the output content ID 104 is not stored even in either the wireless communication memory 37 or the nonvolatile memory 32, the electronic apparatus 2 may read and output the content (for example, sound effects or voice informing the user of the mounting completion of the wireless storage apparatus 3) that the electronic apparatus 2 normally outputs at the time of mounting of the wireless storage apparatus 3, from the nonvolatile memory 32. Alternatively, the electronic apparatus 2 may not output the content.

Further, in the present embodiment, the content-related table 51 and the operation determination unit 52 included in the server apparatus 5 may be included in the information processing apparatus 4. In other words, the verification of the content ID that the server apparatus 5 performs in step S204 may be performed by the information processing apparatus 4. In this case, since the inquiry from the information processing apparatus 4 to the server apparatus 5 in step S203 is not required, the server apparatus 5 may be omitted.

FIG. 3 illustrates a first example of the content-related table 51 according to the present embodiment.

In the content-related table T1, a feature ID e1 and a content ID e2 are associated. For example, the feature A is associated with the content C10, the feature B is associated with the content C20, and the feature C is associated with the content C30.

The content ID e2 may be, for example, the content ID, or the address indicating the storage location of the content.

In addition, one content ID e2 may be associated with a plurality of feature IDs e1, a plurality of content IDs e2 may be associated with one feature ID e1, or a plurality of content IDs e2 may be associated with a plurality of feature IDs e1.

FIG. 4 illustrates a second example of the content-related table 51 according to the present embodiment.

In a content-related table T2, features (feature ID e1) which are input, location data e3 indicating a location where the feature ID e1 is acquired, and content (content IDe2) are associated with each other. The location data e3 may be, for example, position data based on the GPS information. For example, the content C20 is associated if feature B is acquired in the area α, and the content C22 is associated if the same feature B is acquired in the area γ. More specifically, for example, the feature B acquired in Kansai area may be associated with the audio content of Kansai dialect, and the feature B acquired in Tohoku area may be associated with the audio content of Tohoku dialect.

The location data e3 may be, for example, a location where the object is captured (corresponding to S201 in FIG. 2), a location where wireless communication is possible between the wireless storage apparatus 3 and the information processing apparatus 4 by the information processing apparatus 4 being moved closed to the wireless storage apparatus 3, a location where the wireless storage apparatus 3 receives the content information from the information processing apparatus 4 (corresponding to S207 of FIG. 2), or other locations which are not described above. The location data e3 may be a combination of an imaging location of the object 6 and a location where wireless communication is possible between the wireless storage apparatus 3 and the information processing apparatus 4. If the content to be output from the electronic apparatus 2 is switched depending on the location where the wireless storage apparatus 3 receives the content information from the information processing apparatus 4, the information processing apparatus 4 may determine the content that corresponds to the area.

In addition, the content-related table T2 may include items different from the above directions, or a combination of items different from the above directions. For example, in the content-related table T2, the content ID e2 and a time or time zone when the electronic apparatus 2 outputs the content are associated with each other. By referring to the content-related table T2, it is possible to switch the content to be output in accordance with the use time or time zone of the user.

Figure 5:
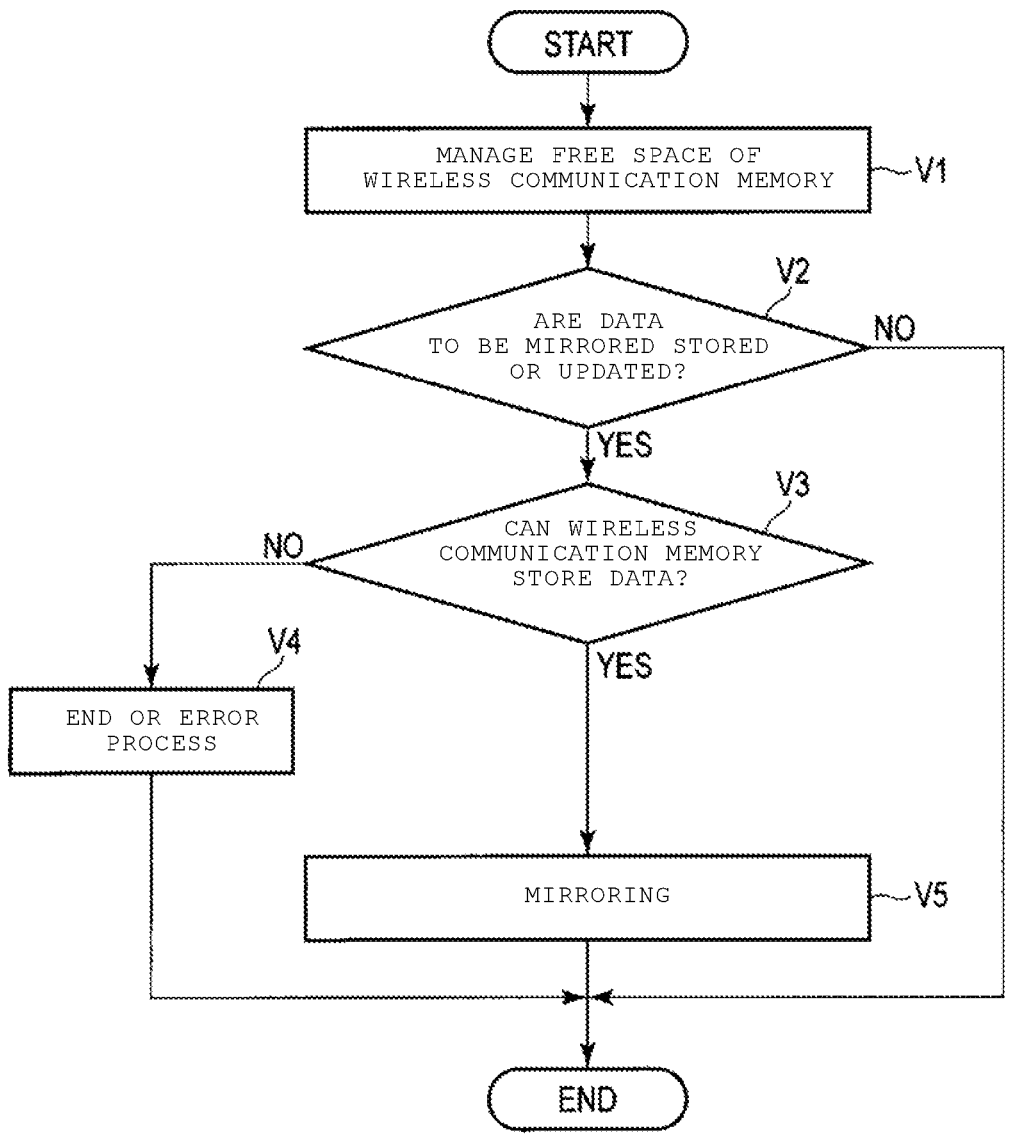
FIG. 5 is a flow chart of mirroring executed by a controller of a wireless storage apparatus according to the first embodiment.

FIG. 5 is a flow chart illustrating mirroring executed by the controller 33 according to the present embodiment.

In step V1, the controller 33 manages the status indicating whether the wireless communication memory 37 can store data, based on the position of the free space of the wireless communication memory 37 and the data capacity of the free space. For example, if the data capacity of the free space of the wireless communication memory 37 is equal to or greater than a predetermined threshold value, the controller 33 determines that the wireless communication memory 37 has status capable of storing data.

In step V2, the controller 33 determines whether or not data to be mirrored is stored or changed in the memory of at least one of the nonvolatile memory 32 and the wireless communication memory 37.

If the data to be mirrored is not stored or changed in the memory of at least one (No in Step V2), the process is ended.

If the data to be mirrored is stored or changed in the memory of at least one (Yes in Step V2), the controller 33 determines whether or not the wireless communication memory 37 can store data based on the status, in step V3.

If the wireless communication memory 37 cannot store data (No in Step V3), the controller 33 performs an ending or error process in step V4. The error process may be, for example, a process of instructing the electronic apparatus 2 or the information processing apparatus 4 to output sound or display an image indicating that data is not successfully changed.

If the wireless communication memory 37 can store data (Yes in Step V3), the controller 33 executes mirroring in step V5.

Figure 6:
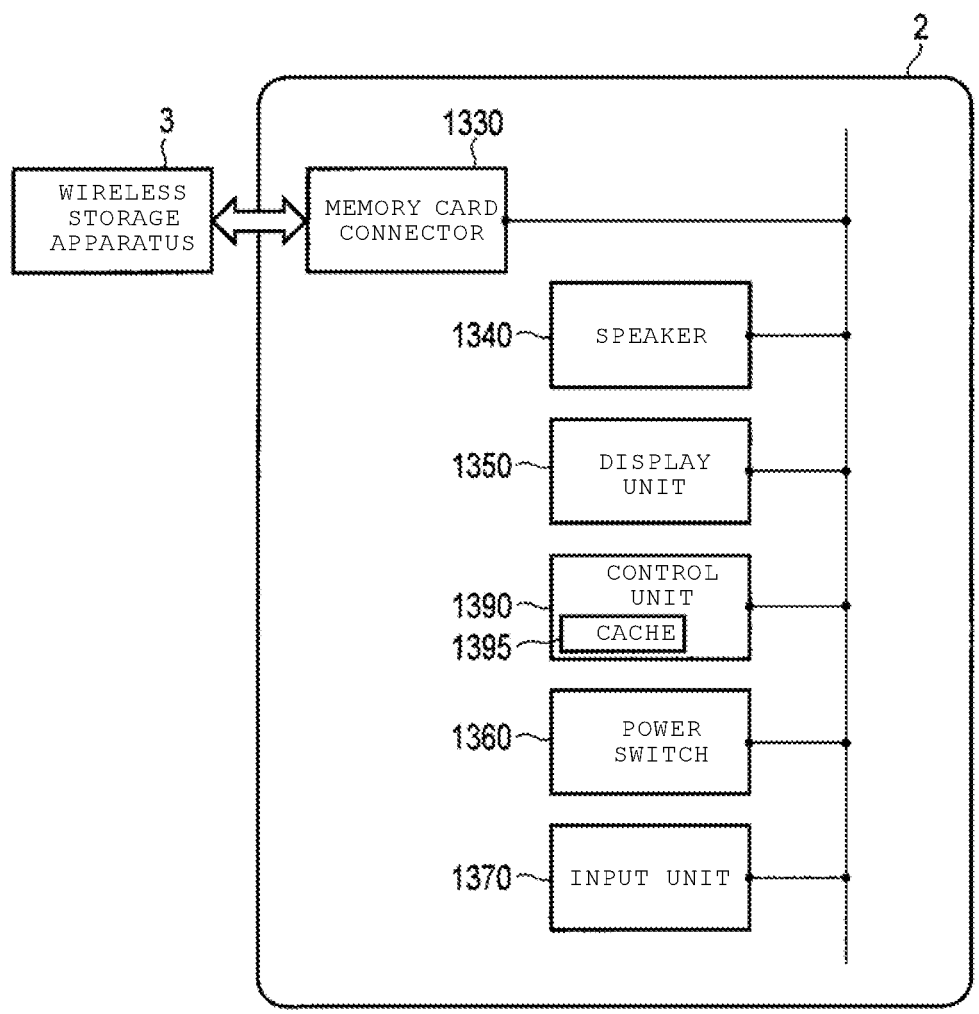
FIG. 6 is a block diagram of an electronic apparatus according to the first embodiment.

FIG. 6 is a block diagram of the electronic apparatus 2 according to the present embodiment.

The electronic apparatus 2 includes a memory card connector 1330, a speaker 1340, and a control unit 1390.

It is possible to insert a storage apparatus, for example, a memory card, to the memory card connector 1330 from the outside. In the present embodiment, the memory card connector 1330 holds wireless storage apparatus 3, for example, an NFC chip-mounted memory card. The memory card connector 1330 corresponds to the mount unit 22a in FIG. 1.

The speaker 1340 converts the data into voice data through a DA converter (not illustrated), and outputs the converted data to the outside.

The electronic apparatus 2 also includes a display unit (display) 1350. If audio data and moving image data are included in contents to be output which are read by the electronic apparatus 2 from the wireless storage apparatus 3, the electronic apparatus 2 may output the audio data from the speaker 1340, and display moving images on the display unit 1350. The electronic apparatus 2 does not output the audio data from the speaker 1340, and may display moving images on the display unit 1350.

The electronic apparatus 2 may include a power switch 1360 that can turn on or off the power of the electronic apparatus 2, and an input unit 1370. The input unit 1370 may include plurality of input means such as, for example, buttons and switches.

The control unit 1390 controls the speaker 1340, the display unit 1350, the power switch 1360, and the input unit 1370. The control unit 1390 is electrically connected to the wireless storage apparatus 3 which is mounted in the memory card connector 1330, and communicates with the electrically connected wireless storage apparatus 3.

In the present embodiment, the control unit 1390 may include the operation control unit 21. The control unit 1390 may be implemented by hardware, or may be even implemented by the processor executing the software.

The control unit 1390 may include a memory 1395. For example, the memory 1395 may be configured separately from the control unit 1390, without being included in the control unit 1390. The memory 1395 may be used as, for example, a cache memory that temporarily stores data. The memory 1395 may be, for example, a serial peripheral interface (SPI) flash memory.

Figure 7:
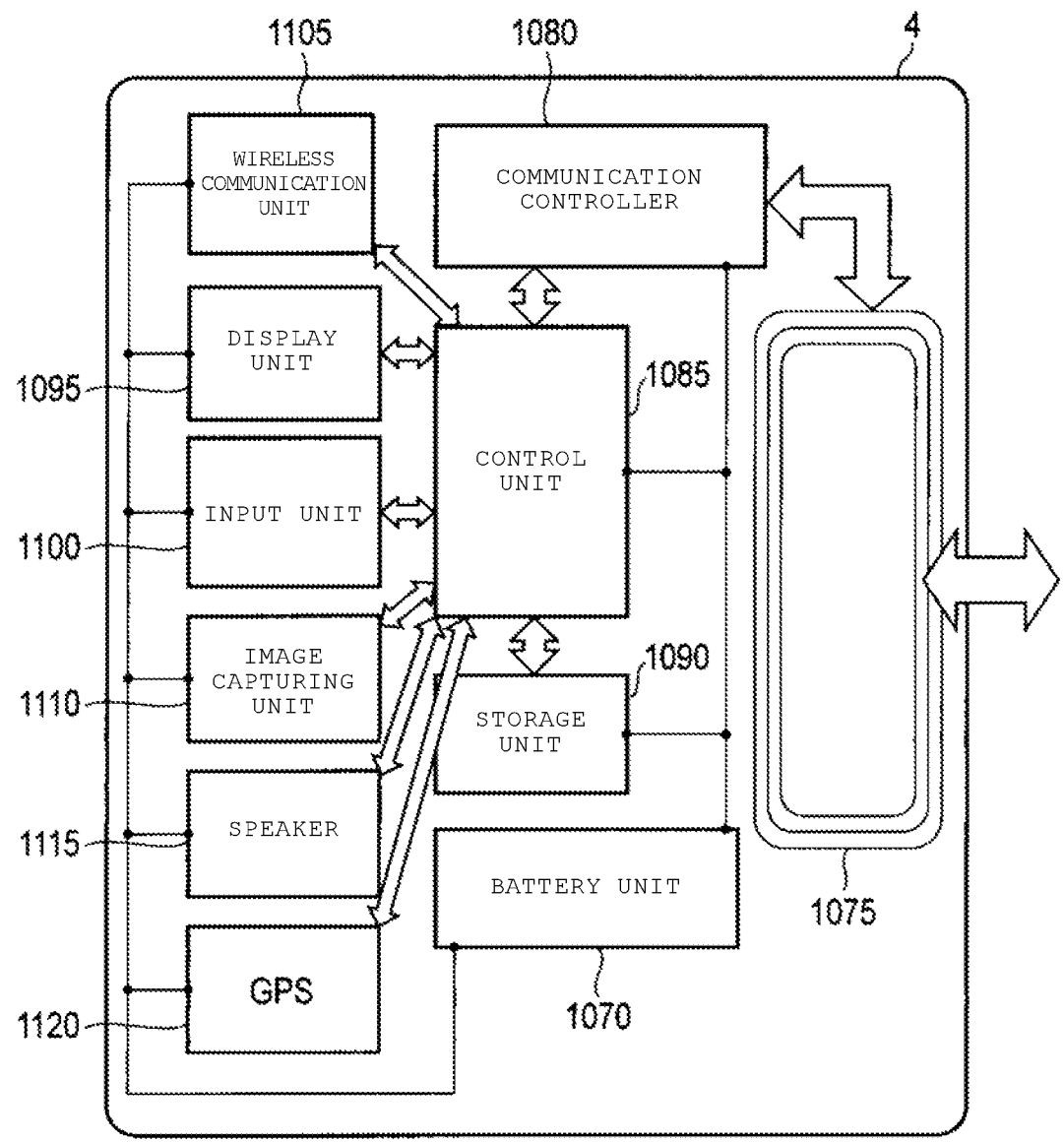
FIG. 7 is a block diagram of an information processing apparatus according to the first embodiment.

FIG. 7 is a block diagram of the information processing apparatus 4 according to the present embodiment. The information processing apparatus 4 can perform wireless communication, and is, for example, a smart phone, a personal digital assistant (PDA), a tablet terminal, a computer, or the like.

The information processing apparatus 4 includes a battery unit 1070, a wireless antenna 1075, a communication controller 1080, a control unit 1085, a storage unit 1090, a display unit 1095, an input unit 1100, a wireless communication unit 1105, an image capturing unit 1110, a speaker 1115, and a GPS 1120. The communication controller 1080 and the control unit 1085 may be implemented as a single controller.

The information processing apparatus 4 can perform an operation and communication, with power supplied from the battery unit 1070.

The information processing apparatus 4 can transmit and receive data, for example, according to the NFC interface. The information processing apparatus 4 may use another wireless communication interface.

The battery unit 1070 is a power source for supplying power to the information processing apparatus 4. The battery unit 1070 is, for example, a battery. The battery unit 1070 may be dry batteries, storage batteries, fuel cells, or the like. More specifically, a lithium ion battery may be used as the battery unit 1070. The battery unit 1070 may be external to the information processing apparatus 4, and for example, may be an AC adapter connected to a commercial power supply, or the like.

The operation possible frequency band of the wireless antenna 1075 is set to a predetermined frequency band corresponding to the NFC.

The wireless antenna 1075 receives commands, addresses, data, information, instructions, signals, or the like, and outputs to the communication controller 1080, the received commands, addresses, data, information, instructions, signals, or the like. The wireless antenna 1075 outputs the commands, addresses, the data, the information, instructions, signals, or the like, which are received from the communication controller 1080. The wireless antenna 1075 is, for example, a PCB pattern antenna.

The communication controller 1080 controls the wireless antenna 1075. The communication controller 1080 can output the commands, addresses, the data, the information, instructions, signals, or the like, which are received from the control unit 1085, through the wireless antenna 1075. The communication controller 1080 can output the data that are received through the wireless antenna 1075, to the control unit 1085.

The control unit 1085 controls various operations of each unit, for example, based on input from the input unit 1100, the wireless communication unit 1105, the image capturing unit 1110, and the wireless storage apparatus 3. The control unit 1085 controls each unit, based on the input data or the calculation result of the data, and outputs the commands or the like to each unit as necessary.

The control unit 1085 is, for example, a semiconductor chip, a circuit formed on a substrate, or a combination of one or a plurality thereof. The control unit 1085 may include at least one of a cache memory and a register that store data temporarily.

The control unit 1085 can output commands, addresses, data, information, instructions, signals, or the like to the wireless antenna 1075 through the communication controller 1080. The control unit 1085 receives the commands, the addresses, the data, the information, the instructions, the signals, or the like which are received by the wireless antenna 1075, and the commands, the addresses, the data, the information, the instructions, the signals, or the like which are read from the wireless storage apparatus 3, through the communication controller 1080.

When writing data into the wireless storage apparatus 3, the control unit 1085 outputs data input from each unit or the calculation result of these data, a write command, and an address, to the communication controller 1080.

The control unit 1085 is electrically connected to each unit, and electrically communicates with each unit. In other words, the control unit 1085 can receive data from each unit, and output the data or the calculation result of the data. For example, the control unit 1085 can output the imaging data which is imaged by the image capturing unit 1110 to the display unit 1095. For example, the control unit 1085 extracts features of the imaging data which is imaged by the image capturing unit 1110, and can output the feature to the wireless communication unit 1105 or to write the feature into the storage unit 1190. For example, the control unit 1085 adds the position information acquired by the GPS 1120 to the features of the imaging data which is read from the storage unit 1090, and output the feature to the wireless communication unit 1105. These are merely examples, and the control unit 1085 may receive data from the respective units and output a calculation result of the data.

In the present embodiment, the control unit 1085 may include the image recognition unit 44 in FIG. 1.

In the present embodiment, the control unit 1085 may be implemented by hardware, or may be even implemented by the processor executing the software.

The storage unit 1090 outputs the stored data to the control unit 1085, based on communication with the control unit 1085. The storage unit 1090 stores data received from the control unit 1085, based on communication with the control unit 1085. The storage unit 1090 is, for example, a memory controller and a nonvolatile memory. Similar to the nonvolatile memory 32, various memories are used as the nonvolatile memory. The memory controller controls the nonvolatile memory. The storage unit 1090 may be, for example, a hard disk drive (HDD), a solid state disk (SSD), or the like. In the present embodiment, the storage unit 1090 may include the storage unit 45 in FIG. 1.

The display unit 1095 outputs data which are received from the control unit 1085 in a form that a user can recognize. The display unit 1095 is, for example, a display. The user can visually recognize the data on the display. Specifically, various types of displays such as a liquid crystal display, a plasma display, an organic EL display, and a three-dimensional display may be used for the display unit 1095. The display unit 1095 displays the data received from the control unit 1085, on the display. The display unit 1095 can display, for example, an image or moving images which are captured by the image capturing unit 1110, in substantially real time.

The input unit 1100 outputs the information which is input by the user as input data, to the control unit 1085. The input unit 1100 is, for example, a touch panel provided on the display. If the user presses down the image displayed on the display, the input unit 1100 detects the position of the touch panel which is pressed, and outputs the position information as input data to the control unit 1085. Specifically, switches arranged in a matrix, or various touch panels of a resistive type, a surface acoustic wave type, an infrared type, an electromagnetic induction type, and an electrostatic capacitance type may be used for the input unit 1100.

The input unit 1100 may be, for example, a microphone. If the user utters a voice, the input unit 1100 may detect the voice, extract the input data by voice conversion, and output the extracted input data to the control unit 1085.

In the present embodiment, the UI unit 42 in FIG. 1 may include the display unit 1095 and the input unit 1100.

The wireless communication unit 1105 includes a wireless antenna and a wireless controller. The wireless communication unit 1105 performs transmission and reception of data, by wireless communication with the outside. The wireless communication unit 1105 outputs the data received from the outside, to the control unit 1085. The wireless communication unit 1105 transmits data received from the control unit 1085 to the outside.

In the present embodiment, the communication unit 41 in FIG. 1 may include the wireless communication unit 1105 and the communication controller 1180.

The image capturing unit 1110 can capture one or both of a still image and moving images. The image capturing unit 1110 outputs the imaging data (image data), in other words, data of a still image or moving images to the control unit 1085. The image capturing unit 1110 may capture a code arranged on the surface of the wireless storage apparatus 3. The image capturing unit 1110 is, for example, a camera. More specifically, the image capturing unit 1110 is, a solid photographing device, for example, a camera using a charge coupled device (CCD) sensor, and a complementary metal oxide semiconductor (CMOS) sensor.

In the present embodiment, the image capturing unit 1110 may include the image capturing unit 43 in FIG. 1.

The speaker 1115 outputs the audio data received from the control unit 1085.

The GPS 1120 acquires position information of the information processing apparatus 4, and outputs the position information to the control unit 1085.

Figure 8:
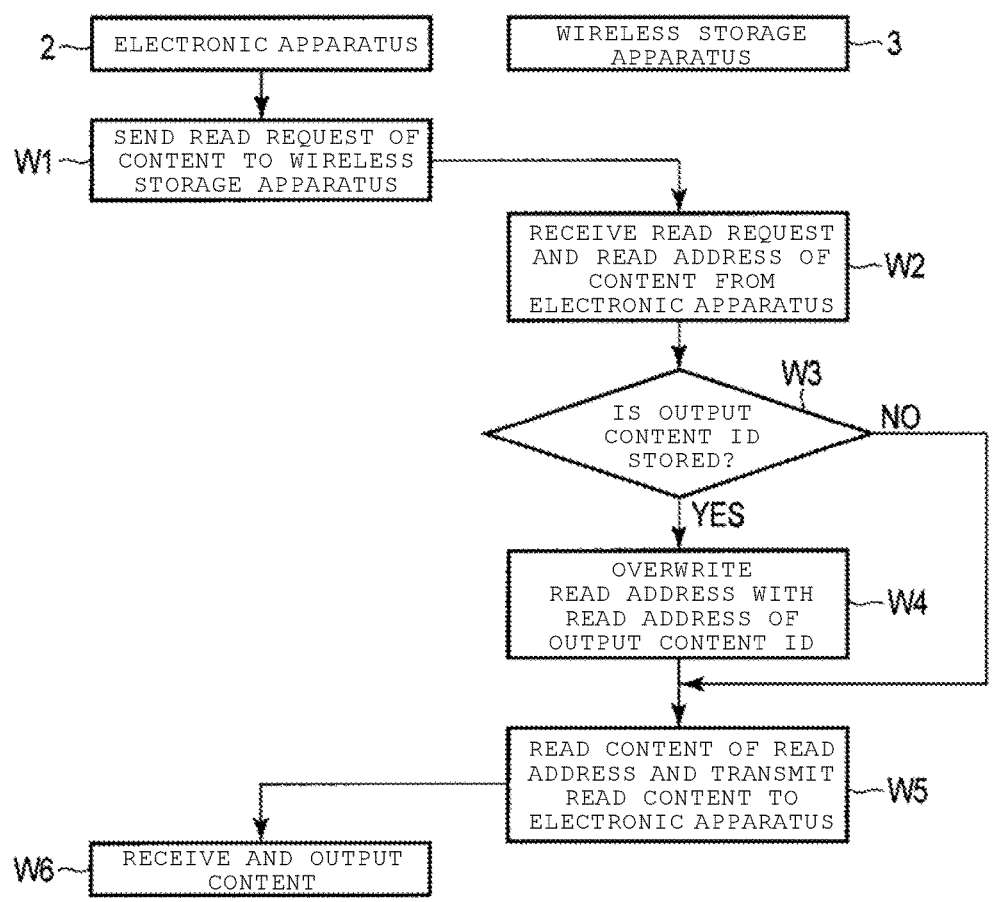
FIG. 8 is a flow chart of a content output process executed by an electronic apparatus and a wireless storage apparatus according to the first embodiment.

FIG. 8 is a flow chart of a content output process executed by the electronic apparatus 2 and the wireless storage apparatus 3 according to the present embodiment, and is an example of step S209 in FIG. 2.

When performing output of content, the electronic apparatus 2 sends a read request for the corresponding content to the wireless storage apparatus 3 in step W1. For example, the electronic apparatus 2 stores a read address of the content for each content to be output, and transmits the read address together with the read request to the wireless storage apparatus 3. The read address may be, specifically, for example, a storage destination address of the content 102 on the nonvolatile memory 32, and if content ID 101 is a read address of the content 102, the read address may be the content ID 101 itself.

Next, the wireless storage apparatus 3 receives the read request and the read address of the content from the electronic apparatus 2 in step W2.

The wireless storage apparatus 3 checks whether or not the output content ID 104 is stored in the wireless communication memory 37 or the nonvolatile memory 32 in step W3.

If the output content ID 104 is stored in the wireless communication memory 37 or the nonvolatile memory 32, the wireless storage apparatus 3 overwrites the read address received from the electronic apparatus 2 with the read address of the output content ID 104 in step W4. When the electronic apparatus 2 designates the output content ID 104 as the read address in step W1, step W4 may be omitted.

If the output content ID 104 is not stored in the wireless communication memory 37 or the nonvolatile memory 32 in step W3, after step W4, the wireless storage apparatus 3 reads the content designated by the read address and transmits the read content to the electronic apparatus 2, in step W5.

In step W6, the electronic apparatus 2 receives content from the wireless storage apparatus 3, and outputs the received content.

In addition, the electronic apparatus 2 may receive the content ID 101 and the content 102 of the wireless storage apparatus 3, store the received content ID 101 and content 102 in the memory area provided in the electronic apparatus 2, and output the content.

The electronic apparatus 2 may start, for example, the content output process (step W1), when the wireless storage apparatus 3 is mounted. For example, if the wireless storage apparatus 3 is mounted in the electronic apparatus 2, the electronic apparatus 2 monitors the wireless communication memory 37 or the nonvolatile memory 32, and if it is determined that the output content ID 104 is stored in the wireless communication memory 37 or the nonvolatile memory 32, the electronic apparatus 2 may start the content output process. In this case, the read address which is designated by the electronic apparatus 2 in step W1 may be the output content ID 104.

In the present embodiment described above, a system which extracts the features that are included in the image captured by the information processing apparatus 4 by image recognition and associates the features with available content, and a system which transmits content from the information processing apparatus 4 to the wireless storage apparatus 3 by wireless communication and the electronic apparatus 2 outputs the content in the wireless storage apparatus 3 are combined. As a result, it is possible to provide a very amusing system which achieves the update of the content to be output in conjunction with the captured image.

In the present embodiment, the imaging of the characteristic object 6 and the update of the content to be output are performed by an intuitive operation such as touching or moving close by the user, by performing wireless communication between the information processing apparatus 4 and the wireless storage apparatus 3, and between the information processing apparatus 4 and the server apparatus 5 by using a smart phone as the information processing apparatus 4. This achieves a very amusing system.

For example, in the present embodiment, an image of clothes having a character printed thereon is used as a captured image, with the electronic apparatus 2 as a toy, the wireless storage apparatus 3 as a memory card, and the information processing apparatus 4 as a smart phone. The content associated with the character that is printed on the clothes is transmitted to the memory card of the toy, and the content in the memory card can be output using the toy, only by the user performs an intuitive and easy operation such as touching the smart phone to the toy equipped with the memory card, after the image is captured by the smart phone.

In addition, for example, the user takes a photo of a particular spot in a theme park with a smart phone, and moves the smart phone close to the memory card after taking the photo. The image recognition unit 44 recognizes the area ID of the captured spot from the captured image, and the controller 33 unlocks confidential data in the memory card, corresponding to the area ID of the spot that the user visits. Since this allows only the content associated with the spot that the user visits to be disclosed to the user, it is possible to provide the content associated with the taste of the user. In this case, setting information indicates whether to lock or unlock the confidential data.

Second Embodiment

In a second embodiment, a modification example of the first embodiment will be described.

Figure 9:
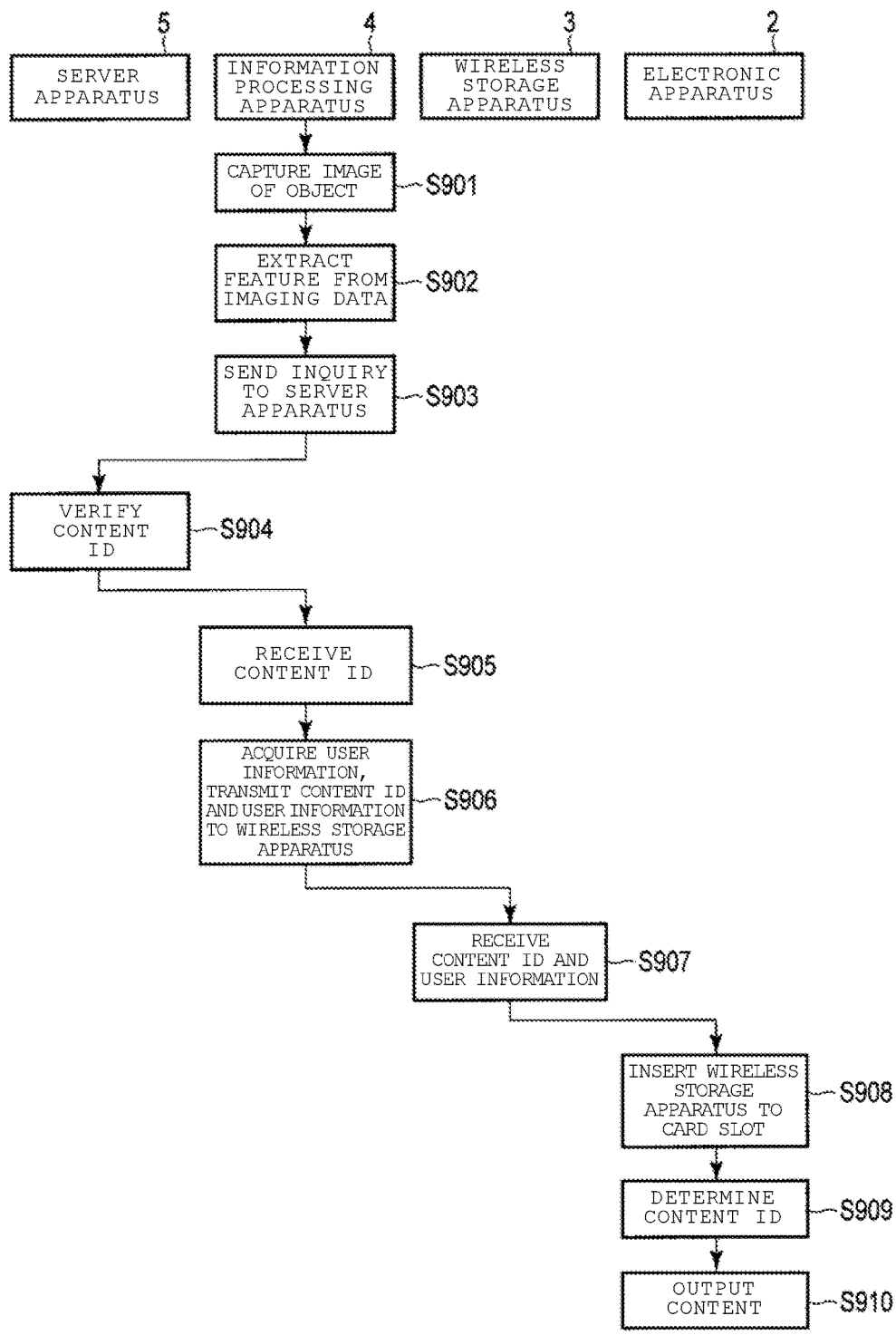
FIG. 9 is a flow chart of a process carried out by an information processing system according to a second embodiment.

FIG. 9 is a flowchart illustrating an example of the processing of information processing system 1 according to the second embodiment.

In the first embodiment, when the information processing apparatus 4 makes an inquiry of the feature obtained based on the imaging data to the server apparatus 5, at the same time the information processing apparatus 4 transmits the acquired user information to the server apparatus 5, and the server apparatus 5 determines the content information.

On the other hand, in the present embodiment, when the information processing apparatus 4 performs wireless communication with the wireless storage apparatus 3, at the same time the information processing apparatus 4 transmits the acquired (for example, generated, received from the outside, or read from the storage unit 45) user information to the wireless storage apparatus 3. Then, the electronic apparatus 2 determines content information based on the user information and the content-related table 51. In addition, the content that is output in the present embodiment is assumed to be stored in the nonvolatile memory 32 of the wireless storage apparatus 3 in advance.

The operations carried out by the information processing apparatus 4 in step S901 and step S902 are the same as those carried out in step S201 and step S202 in FIG. 2.

In step S903, the communication unit 41 of the information processing apparatus 4 transmits the features obtained based on the imaging data, to the server apparatus 5.

In step S904, the server apparatus 5 receives the feature from the information processing apparatus 4. The received feature is converted into the feature ID by the server apparatus 5. The server apparatus 5 performs verification of the content ID from the content-related table 51 using the feature ID, and determines the content ID of the content to be output. In the present embodiment, the content-related table 51 included in the server apparatus 5 is, for example, the content-related table T1 illustrated in FIG. 3. In addition, the operation of step S904 may be performed by the operation determination unit 52.

In step S905, the server apparatus 5 transmits the content ID determined in step S904 to the information processing apparatus 4, and the communication unit 41 of the information processing apparatus 4 receives the content ID.

In step S906, when the information processing apparatus and the wireless storage apparatus 3 starts wireless communication, the information processing apparatus 4 generates user information (calendar information 451, position information 452, personal information 453, and the like), and stores the user information in the storage unit 45. The communication unit 41 of the information processing apparatus 4 performs wireless communication with the wireless storage apparatus 3, and transmits the content ID and the user information stored in the storage unit 45 to the wireless storage apparatus 3. For example, the content ID and the user information correspond to the first setting information.

In step S907, the communication controller 34 of the wireless storage apparatus 3 receives the content ID and the user information. The communication controller 34 stores the received user information as the user information 105, and the received content ID as the output content ID 104, in the wireless communication memory 37.

In step S908, the wireless storage apparatus 3 is mounted in the electronic apparatus 2, in response to the operation of the user. The recognition processing of the wireless storage apparatus 3 by the electronic apparatus 2 is the same as step S208 in FIG. 2.

In step S909, the electronic apparatus 2 determines the content ID of the content to be output, from the content ID and the user information which are received by the wireless storage apparatus 3. For example, the content ID of the content to be output corresponds to the second setting information, which is used in the operation of the electronic apparatus 2. In the present embodiment, the electronic apparatus 2 may include the content-related table 51. In this case, the operation control unit 21 of the electronic apparatus 2 determines the content ID of the content to be output using the content-related table 51 of the electronic apparatus.

For example, when the wireless storage apparatus 3 receives the content C10 as the content ID and the location data of the area γ as the user information, the electronic apparatus 2 determines the content ID of the content to be output as the content C12, by searching for the content ID corresponding to the location data (area γ), among the group of feature IDs (features A) including the content C10 in the content-related table T2 of the information processing system.

In step S910, the electronic apparatus 2 performs the output process of the content corresponding to the content ID that the electronic apparatus 2 determined in step S909.

In the present embodiment, the content-related tables 51 which are respectively included in the server apparatus 5 and the electronic apparatus 2 may have different forms. Alternatively, the server apparatus 5 and the electronic apparatus 2 may include the same content-related table 51.

In the present embodiment, the content-related table 51 included in the server apparatus 5 may be contained in the information processing apparatus 4. In other words, the verification of the content ID which is performed by the server apparatus 5 in step S904 may be performed by the information processing apparatus 4. In this case, since the inquiry made from the information processing apparatus 4 to the server apparatus 5 in step S903 is not required, the server apparatus 5 may be omitted.

In the present embodiment, the verification of the content ID which is performed by the server apparatus 5 in step S904 may be performed by the electronic apparatus 2. In this case, since the inquiry made from the information processing apparatus 4 to the server apparatus 5 in step S903 is not required, the server apparatus 5 may be omitted. In this case, the information processing apparatus 4 transmits the features extracted from the imaging data and the user information to the wireless storage apparatus 3 in step S906. The electronic apparatus 2 determines the content ID of the content to be output from the features which are extracted from the imaging data and the user information, using the content-related table 51, in step S909.

In the present embodiment described above, the electronic apparatus 2 determines the content ID of the content to be output, based on timing when the information processing apparatus 4 performs wireless communication with the wireless storage apparatus 3. This allows the content to be output to be changed depending on a place or time where or when the user touches.

Further, in the present embodiment, since the transmission and reception of the content is not performed between the information processing apparatus 4 and the server apparatus 5 while the server apparatus 5 does not hold the content, it is possible to reduce workload of the server apparatus 5.

Third Embodiment

In a third embodiment, a modification example of the second embodiment will be described.

Figure 10:
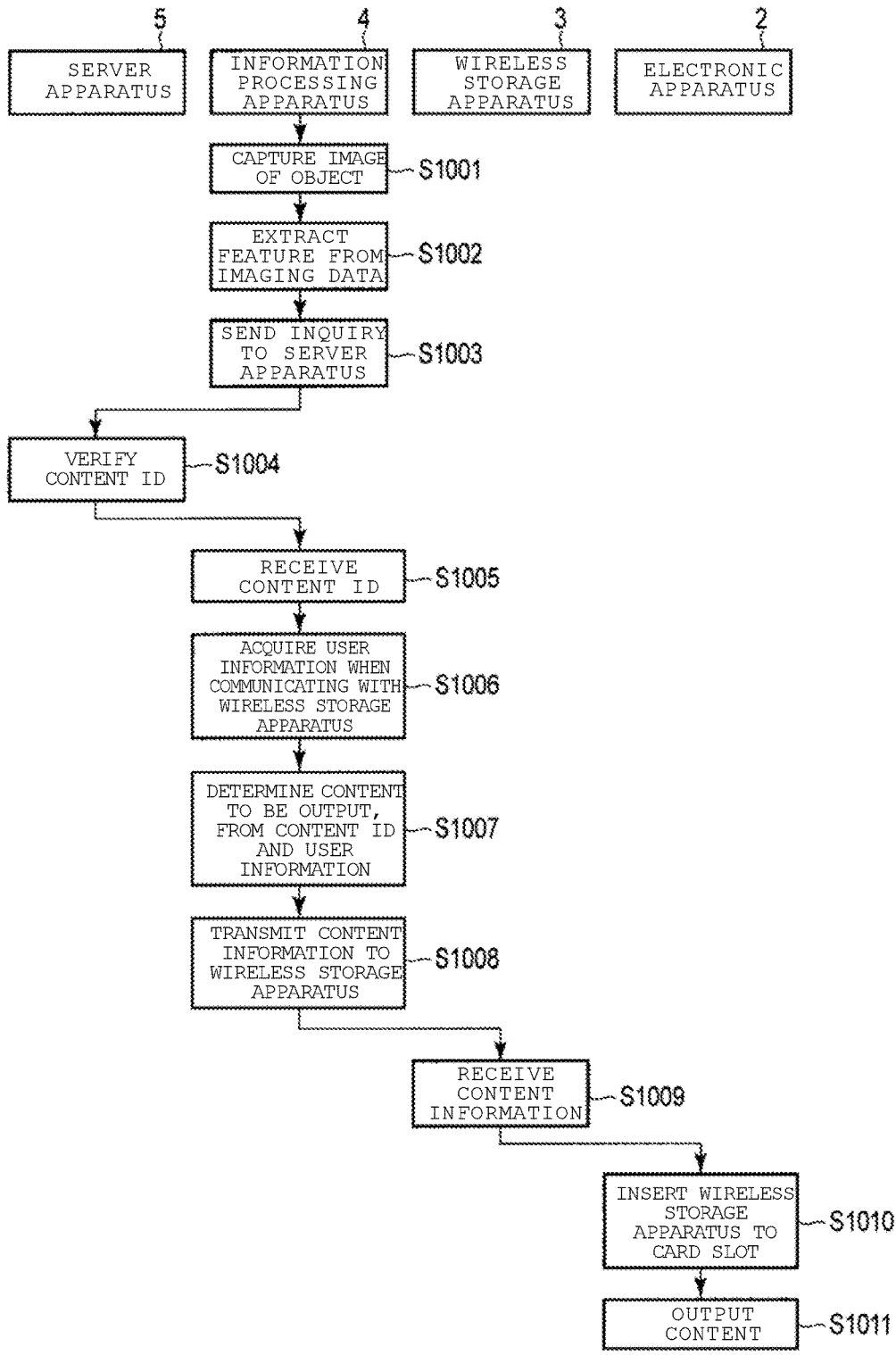
FIG. 10 is a flow chart of a process carried out by an information processing system according to a third embodiment.

FIG. 10 is a flow chart illustrating an example of a process of the information processing system 1 according to the present embodiment.

In the second embodiment, when the information processing apparatus 4 performs wireless communication with the wireless storage apparatus 3, at the same time as the information processing apparatus 4 transmits the acquired user information to the wireless storage apparatus 3, and the electronic apparatus 2 determines content information to be output.

On the other hand, in the present embodiment, when the information processing apparatus 4 performs wireless communication with the wireless storage apparatus 3, the information processing apparatus 4 determines content to be output based on the user information and the content ID which are acquired, and transmits the content to the wireless storage apparatus 3. In addition, the content output in the present embodiment is assumed to be stored in the storage unit 45 of the information processing apparatus 4 in advance.

The operations of the information processing apparatus 4 in step S1001 to step S1005 are the same as step S901 to step S905 in FIG. 9.

In step S1006, when the information processing apparatus and the wireless storage apparatus 3 start wireless communication, the information processing apparatus 4 generates the user information (the calendar information 451, the position information 452, the personal information 453, or the like), and stores the user information in the storage unit 45.

In step S1007, the information processing apparatus 4 determines content to be output, based on the content ID received in step S1005 and the user information stored in the storage unit 45. In the present embodiment, the information processing apparatus 4 may include the content-related table 51 and the operation determination unit 52. In this case, the operation determination unit 52 of the information processing apparatus 4 determines content using the content-related table (for example, the content-related table T2) of the information processing system. A method of determining content is the same as the method described above in step S909 in FIG. 2.

In step S1008, the communication unit 41 of the information processing apparatus 4 performs wireless communication with the wireless storage apparatus 3, and transmits the content and the content ID (that is, the content information) which is determined in S1007, to the wireless storage apparatus 3.

In step S1009, the communication controller 34 of the wireless storage apparatus 3 receives the content and the content ID from the information processing apparatus 4. The communication controller 34 stores the received content as the content 102 and the received content ID as the content ID 101 and the output content ID 104, respectively, in the wireless communication memory 37. Further, the communication controller 34 changes the change flag 103 to be On.

The controller 33 of the wireless storage apparatus 3 confirms that the change flag 103 is On, and stores the changed content 102 in the nonvolatile memory 32 by mirroring.

In step S1010, the wireless storage apparatus 3 is mounted in the electronic apparatus 2 in response to the user's operation. The confirmation process of the wireless storage apparatus 3 by the electronic apparatus 2 is the same as step S208 in FIG. 2.

In step S1011, the electronic apparatus 2 performs the output process of content. The output process of content is the same as step S209 in FIG. 2.

In the present embodiment, the content-related tables 51, which are respectively included in the server apparatus and the information processing apparatus 4, may have different forms. Alternatively, the server apparatus 5 and the information processing apparatus 4 may include the same content-related table 51.

In the present embodiment, the content-related table 51 included in the server apparatus 5 may be included in the information processing apparatus 4. In other words, the verification of the content ID which is performed by the server apparatus 5 in step S1004 may be performed by the information processing apparatus 4. In this case, since the inquiry made by the information processing apparatus 4 to the server apparatus 5 in step S1003 is not required, the server apparatus 5 may be omitted. In this case, the information processing apparatus 4 can manage alone the content-related table 51 and the content.

In the present embodiment described above, the information processing apparatus 4 determines content based on the user information acquired at timing when the information processing apparatus 4 performs wireless communication with the wireless storage apparatus 3. This enables update of varied content. In addition, without changing the operation control unit 21 of the existing electronic apparatus 2, it is possible to update the content to be generated by the electronic apparatus 2.

Fourth Embodiment

In a fourth embodiment, a modification example of the process of the information processing system 1 according to the third embodiment will be described.

Figure 11:
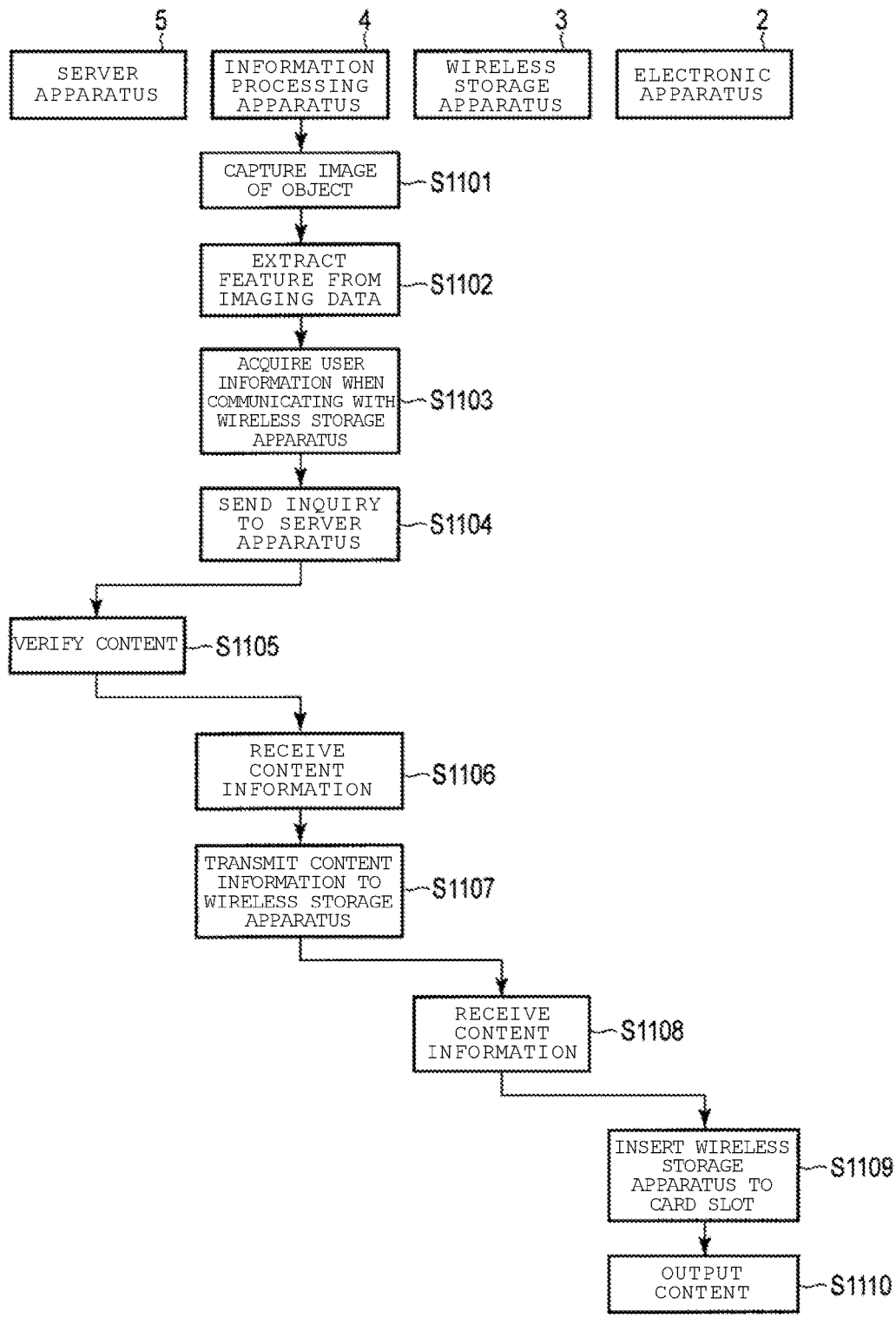
FIG. 11 is a flow chart of a process carried out by an information processing system according to a fourth embodiment.

FIG. 11 is a flow chart of a process carried out by the information processing system 1 according to the third embodiment.

In the third embodiment, when the information processing apparatus 4 performs wireless communication with the wireless storage apparatus 3, the information processing apparatus 4 determines content to be output, from the user information and the content ID which are acquired, and transmits the content to the wireless storage apparatus 3.

On the other hand, in the present embodiment, when the information processing apparatus 4 performs wireless communication with the wireless storage apparatus 3, the information processing apparatus 4 transmits the user information and the content ID which are acquired, to the server apparatus 5 to make an inquiry of content. The information processing apparatus 4 receives the content from the server apparatus 5, and transmits the received content to the wireless storage apparatus 3. In addition, the content that is output in the present embodiment is assumed to be stored in the server apparatus 5 in advance.

The operations of the information processing apparatus 4 in step S1101 and step S1102 are the same as step S201 and step S202 of FIG. 2.

In step S1103, when the information processing apparatus and the wireless storage apparatus 3 start wireless communication, the information processing apparatus 4 generates the user information (the calendar information 451, the position information 452, the personal information 453, or the like), and stores the user information in the storage unit 45.

In step S1104, the communication unit 41 of the information processing apparatus 4 transmits the features acquired based on the imaging data and the user information which is stored in the storage unit 45, to the server apparatus 5.

In step S1105, the operation determination unit 52 of the server apparatus 5 converts the features received from the information processing apparatus 4 into the feature ID. The operation determination unit 52 performs verification of the content from the content-related table 51, using the feature ID and the user information, and determines the content to be output next by the electronic apparatus 2.

In step S1106, the communication unit 41 receives the content and the content ID (that is, content information) which are determined in step S1105 by the server apparatus 5.

The operations of the information processing apparatus 4, the wireless storage apparatus 3, and the electronic apparatus 2 in step S1107 to step S1110 are the same as step S206 to step S209 in FIG. 2.

In the present embodiment described above, since the information processing apparatus 4 makes an inquiry of content information to the server apparatus 5 when performing wireless communication with the wireless storage apparatus 3, the server apparatus 5 determines content based on the user information which is acquired at a timing when the information processing apparatus 4 perform wireless communication with the wireless storage apparatus 3. In other words, in the present embodiment, similar to the second and third embodiments, even in a case of acquiring the user information when the information processing apparatus 4 performs wireless communication with the wireless storage apparatus 3, the server apparatus 5 can store content. Thus, it is easy to manage content, for example, when the number of contents is large or when there are a large number of users.

Fifth Embodiment

In a fifth embodiment, a modification example of the first to fourth embodiments will be described.

In the fifth embodiment, an accessory may be mounted on the electronic apparatus 2. The electronic apparatus 2 performs control, for example, such as changing the type of content to be output by the electronic apparatus 2, according to the type of the mounted accessory.

The accessory is, for example, a merchandise to be applied or attached to the electronic apparatus 2. The accessory is, for example, a medal, a key holder, a strap, a card, or the like. In the present embodiment, the accessory is the medal as an example.

Figure 12:
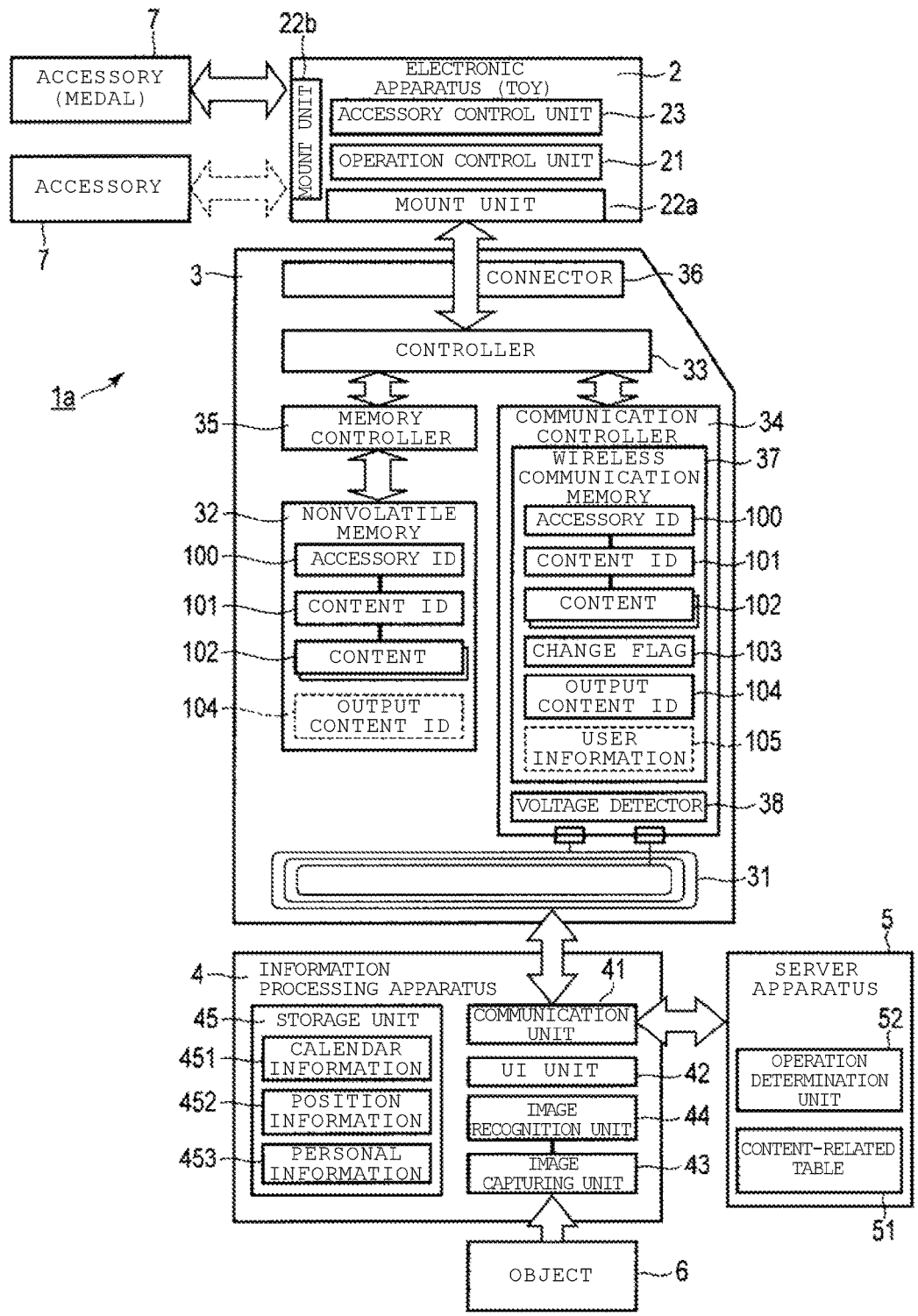
FIG. 12 is a block diagram of an information processing system according to a fifth embodiment.

FIG. 12 is a block diagram of an information processing system 1a according to the present embodiment. Below, a difference from the configuration (FIG. 1) of the information processing system 1 according to the first embodiment will be described.

The accessory 7 has information such as a code or a groove indicating the accessory ID of the accessory 7. The electronic apparatus 2 can read the accessory ID.

The accessory ID may be an ID specific to the accessory 7, or an ID indicating the type (for example, version, or the like) of the accessory 7. The accessory ID is, for example, a bit code, a bar code, or a two-dimensional code, and may be attached to the accessory 7.

In addition, the accessory 7 may have the electronic apparatus ID in addition to the accessory ID. In this case, the electronic apparatus 2 reads the electronic apparatus ID, in addition to the accessory ID.

In addition, in the present embodiment, the accessory ID may include the electronic apparatus ID. In this manner, when the accessory ID includes the electronic apparatus ID, there is no need to separately communicate the accessory ID and the electronic apparatus ID in the information processing system 1a, and there is no need to separately read the electronic apparatus ID by reading the accessory ID. Therefore, it is possible to efficiently perform and simplify the management of data and communication of data.

In the present embodiment, the electronic apparatus 2 includes a mount unit 22b that detachably mounts the accessory 7, and an accessory control unit 23.

The accessory control unit 23 recognizes the accessory ID of the accessory 7 mounted on the electronic apparatus 2, and stores the accessory ID in the nonvolatile memory 32, through the connector 36, the controller 33, and the memory controller 35 of the wireless storage apparatus 3.

For example, the nonvolatile memory 32 stores the accessory ID 100, the content ID 101, the address, and the content 102, in association with each other. The nonvolatile memory 32 stores, for example, the output content ID 104 as the setting information. In addition, the operation control unit 21 may associate and manage the accessory ID and the content ID or the address. The association between the accessory ID and the content ID or the address may be managed by the accessory control unit 23.

Since the content to be output is changed for each accessory 7 mounted on the electronic apparatus 2, the operation control unit 21 recognizes the content ID or the address corresponding to the accessory ID of the accessory 7 mounted on the electronic apparatus 2 and the output content ID 104, using the association which is managed in the nonvolatile memory 32, reads out content corresponding to the recognized content ID or address from the wireless storage apparatus 3 and outputs the read content. This enables the output of the content corresponding to the output content ID 104, and the change the content corresponding to the output content ID 104 based on the accessory ID. Further, if the content corresponding to the accessory ID is prepared, it is possible to change the content depending on the output content ID 104.

The user can mount the accessory 7 to the mount unit 22*b* of the electronic apparatus 2, and replace or remove the mounted accessory 7.

The electronic apparatus 2 may perform two-way communication with the accessory 7, in addition to the wireless storage apparatus 3. However, the communication between the electronic apparatus 2 and the accessory 7 is not limited to the two-way communication. For example, the electronic apparatus 2 may read out the information attached to the accessory 7. The information attached to the accessory 7 may be, for example, an accessory ID, or audio data corresponding to the accessory. 7.

The nonvolatile memory 32 further stores, for example, the accessory ID 100 of the accessory 7 that the current electronic apparatus 2 uses. The content ID 101 and the content 102 of the nonvolatile memory 32 may be managed in association with every accessory ID 100. The electronic apparatus 2 refers to the information in the nonvolatile memory 32, and can recognize a content 102 to be output for each accessory ID 100.

The wireless communication memory 37 may further store, for example, the accessory ID 100. The information processing apparatus 4 may designate the accessory ID, at the time of sending the content information to the wireless storage apparatus 3 (for example, step S206 in FIG. 2). Thus, the content ID 101 and the content 102 of the accessory ID designated in the accessory ID 100 are updated, by the controller 33 performing mirroring.

In addition, the wireless communication memory 37 may store, for example, data related to the accessory 7. The data related to the accessory 7 is recognition ID data of the accessory 7, data included in the code provided in the accessory 7, flag information generated from the data, or the like.

In the present embodiment, the mirroring performed by the controller 33 may be performed during the mounting of the accessory 7, or may be performed during the removal of the accessory 7.

In the present embodiment, when the electronic apparatus 2 determines the content (for example, S909 in FIG. 9), the electronic apparatus 2 may determine the content ID of the content to be output, using the accessory ID of accessory 7 which is mounted on the electronic apparatus 2. For example, if a plurality of content IDs is selected as output candidates from the result of image recognition by the information processing apparatus 4, the electronic apparatus 2 may select the content ID associated with the accessory ID of the accessory 7 which is mounted on the electronic apparatus 2 as the output content ID, among the plurality of content IDs of the output candidates. Here, the association between the accessory ID and the content ID may be managed by any one of the operation control unit 21, the accessory control unit 23, and the nonvolatile memory 32 of the wireless storage apparatus 3.

Further, for example, if a plurality of content IDs is selected as output candidates from the result of image recognition by the information processing apparatus 4, the electronic apparatus 2 may compare a category to which the accessory ID of the accessory 7 which is mounted on the electronic apparatus 2 with a category to which the plurality of content IDs belong, and select a content ID belonging to the same category as the accessory ID as the output content ID. Here, the category is, for example, classification of an accessory ID and a content ID based on the theme, the concept, the types of characters, the features, or the like of the accessory and the content. For example, it is assumed that a plurality of characters which is to output first content (for example, sound or image) belong to a first category. In this case, the accessory IDs of the plurality of characters belonging to the first category are associated with the first category. In addition, the content ID of the first content is associated with the first category. The association between the accessory ID and the category, and the association between the content ID and the category may be managed by any one of the operation control unit 21, the accessory control unit 23, and the nonvolatile memory 32 of the wireless storage apparatus 3.

In the present embodiment, when the electronic apparatus 2 outputs content, the aspect of the output of the content may be varied according to the accessory ID of the accessory 7 which is mounted on the electronic apparatus 2.

For example, if the output content ID 104 is not the content ID associated with the accessory ID, the electronic apparatus 2 may output, for example, the audio of that effect, or another content associated with the accessory ID (for example, content that is set as the standard, among the content associated with the accessory ID) or may not output content.

Further, for example, when the accessory 7 is not mounted on the electronic apparatus 2, content may not be output.

Figure 13:
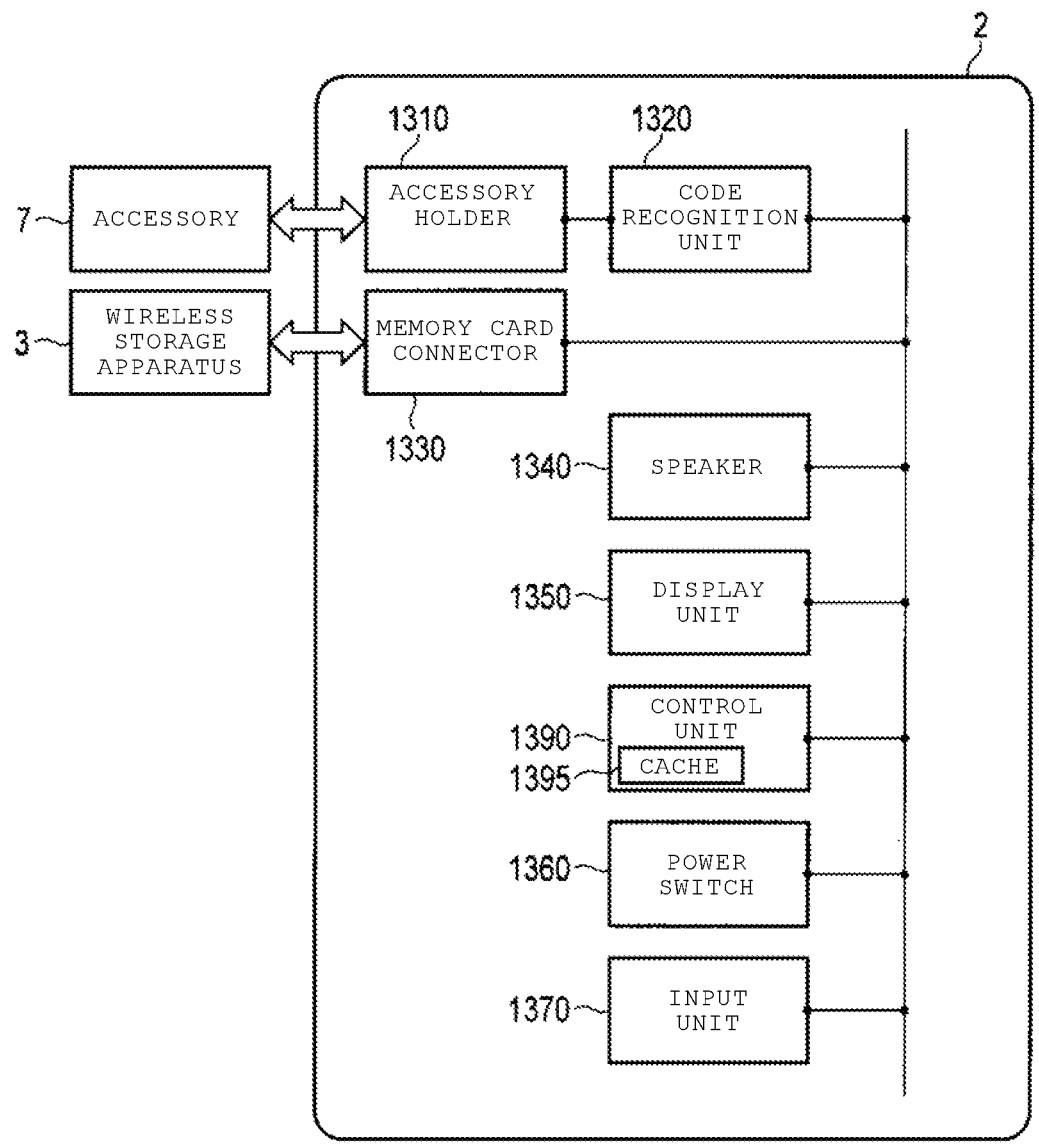
FIG. 13 is a block diagram of an electronic apparatus according to the fifth embodiment.

FIG. 13 is a block diagram of the electronic apparatus according to the present embodiment. The following describes difference from the configuration (FIG. 6) of the electronic apparatus 2 according to the first embodiment.

The electronic apparatus 2 further includes an accessory holder 1310 and a code recognition unit 1320.

The accessory holder 1310 holds, for example, the accessory 7, which is inserted from the outside. In addition, the accessory holder 1310 may hold the accessory 7, without being inserted from the outside. For example, the accessory holder 1310 may be a ring-shaped holder that holds the accessory 7 of a key holder. The accessory holder 1310 corresponds to the mount unit 22*b* in FIG. 1.

The accessory 7 is, for example, a card having a character drawn thereon. For example, one character is drawn on a single accessory 7. However, without being limited to this case, a plurality of characters may be drawn on a single accessory 7. Information related to the drawn character is stored on a single accessory 7. The accessory 7 has the information, for example, in a form of a code. However, without being limited thereto, for example, the accessory 7 may include an NFC chip, and information on the character may be stored in the NFC chip, and the information on a character may be stored in the NFC chip. If the information on a character is stored in the NFC chip or an NFC tag, it is possible to change the data later, and for example, it is possible to easily upgrade of the character on the information processing system 1*a*.

When the information related to the drawn character is stored in a code, if the accessory 7 is held in the accessory holder 1310, the code of the accessory 7 opposes (faces) the code recognition unit 1320.

The code recognition unit 1320 reads the information on the drawn character, from the code of the accessory 7, upon receipt of an instruction from the outside, and transmits the information on a character to the wireless storage apparatus 3. For example, the information on the character may include address information to be read from the nonvolatile memory 32 included in the wireless storage apparatus 3.

The control unit 1390 controls the code recognition unit 1320.

The controller 33 of the wireless storage apparatus 3 receives the information on the character, and reads the correlated information. Specifically, the controller 33 outputs a read instruction and an address to the memory controller 35, and the memory controller 35 reads data from the memory of the address correlated with the information on a character, and outputs the read data to the controller 33. The wireless storage apparatus 3 outputs the data to the speaker 1340.

Figure 14A:
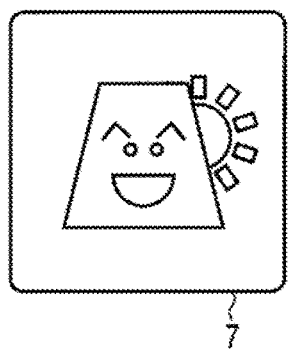
FIGS. 14A and 14B illustrate surfaces of an accessory according to the fifth embodiment.
Figure 14B:
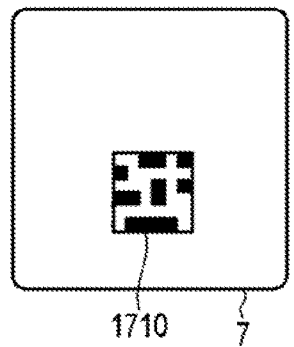

FIGS. 14A and 14B illustrate surfaces of the accessory 7 according to the present embodiment.

FIG. 14A is a plan view of one surface (front surface) of the accessory 7.

FIG. 14B is a plan view of the other surface (rear surface) of the accessory 7.

The accessory 7 includes, for example, the character and the code 1710. The code 1710 can be detected using the code recognition unit 1320 of the electronic apparatus 2.

In the present embodiment described above, the accessory 7 can be mounted on the electronic apparatus 2, and the accessory control unit 23 recognizes the accessory ID. In addition, the operation control unit 21 determines content corresponding to the accessory ID, and controls the output of the content. Accordingly, the electronic apparatus 2 can output a variety of contents corresponding to the accessory 7 which is mounted on the electronic apparatus 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication system including a storage apparatus and a computing device, the storage apparatus comprising:
    a connector through which the storage apparatus communicates with an electronic apparatus and receives power from the electronic apparatus;
    a wireless antenna through which the storage apparatus communicates with the computing device;
    a nonvolatile first memory having stored therein visual or audio content to be output through the electronic apparatus when the connector is electrically coupled to the electronic apparatus, each item of the visual or audio content being associated with a content ID;
    a communication controller that is powered from an induction current generated when a wireless signal is received through the wireless antenna, the communication controller including a second memory in which the communication controller stores a content ID transmitted from the computing device via the wireless signal; and
    a controller that is powered using the power supplied from the electronic apparatus through the connector when the connector is electrically coupled to the electronic apparatus, wherein the controller is configured to retrieve the visual or audio content from the first memory based on the content ID transmitted from the computing device and transmits the retrieved visual or audio content to the electronic apparatus through the connector for playback by the electronic apparatus,
    wherein the computing device comprises an image capturing unit and is configured to extract a set of feature values from data of an image captured by the image capturing unit and transmit the wireless signal containing the content ID to the storage apparatus, the content ID being determined based on the extracted set of feature values and geographical or temporal information relating to the computing device.

2. The wireless communication system according to claim 1, wherein the computing device requests a server to determine the content ID based on the extracted set of feature values and the user-specific geographical or temporal information, and responsive to the request, the server determines the content ID based on the extracted set of feature values and the user-specific geographical or temporal information and transmits the determined content ID to the computing device.

3. The wireless communication system according to claim 2, wherein the server stores a plurality of content IDs and associates each content ID with a set of feature values and geographical or temporal information.

4. The wireless communication system according to claim 3, wherein the content ID is determined based on the extracted set of feature values and the geographical or temporal information which is determined at a time at which the image was captured by the computing device.

5. The wireless communication system according to claim 3, wherein the content ID is determined based on the extracted set of feature values and the geographical or temporal information which is determined at a time at which the computing device came within a wireless communication range of the storage apparatus.

6. The wireless communication system according to claim 1, wherein the controller copies the content ID transmitted from the computing device to the first memory after the connector is electrically coupled to the electronic apparatus.

7. The wireless communication system according to claim 6, wherein storage apparatus is an SD card having a wireless communication function and the electronic apparatus has an SD card receptacle having terminals that engage with the connector when the SD card is placed in the SD card receptacle.

8. The wireless communication system according to claim 7, wherein the computing device and the storage apparatus are configured to communicate with each other using a near-field communication protocol.

9. The wireless communication system according to claim 8, wherein the electronic apparatus includes an output device to play back the visual or audio content and does not have a nonvolatile memory in which the visual or audio content is stored.

10. The wireless communication system according to claim 9, wherein the electronic apparatus is a toy apparatus that is worn on a wrist of a person.

11. A method of selecting visual or audio content to be played back by an electronic apparatus and playing back the selected visual or audio content using the electronic apparatus, said method comprising:
    capturing an image of an object using a camera of a computing device;
    responsive to the capturing, extracting a set of feature values of the object from data of the captured image and determining a content ID of visual or audio content to be played back by the electronic apparatus, based on the extracted set of feature values and geographical or temporal information relating to the computing device;

transmitting a wireless signal containing the content ID to a storage apparatus for the electronic apparatus, wherein the storage apparatus includes a connector through which the storage apparatus communicates with the electronic apparatus and receives power from the electronic apparatus, a wireless antenna through which the wireless signal is received, a communication controller that is powered from an induction current generated from the wireless signal, a nonvolatile memory having stored therein visual or audio content to be output through the electronic apparatus when the connector is electrically coupled to the electronic apparatus, and a controller that is powered using the power supplied from the electronic apparatus through the connector when the connector is electrically coupled to the electronic apparatus;

responsive to the connector being electrical coupled to the electronic apparatus, retrieving the visual or audio content from the nonvolatile memory based on the content ID contained in the wireless signal and transmitting the retrieved visual or audio content to the electronic apparatus through the connector; and playing back the video or audio content by the electronic apparatus.

12. The method according to claim 11, wherein the computing device requests a server to determine the content ID based on the extracted set of feature values and the geographical or temporal information, and responsive to the request, the server determines the content ID based on the extracted set of feature values and the geographical or temporal information and transmits the determined content ID to the computing device.

13. The method according to claim 12, wherein the server stores a plurality of content IDs and associates each content ID with a set of feature values and geographical or temporal information.

14. The method according to claim 13, wherein the content ID is determined based on the extracted set of feature values and the geographical or temporal information which is determined at a time at which the image was captured by the computing device.

15. The method according to claim 13, wherein the content ID is determined based on the extracted set of feature values and the geographical or temporal information which is determined at a time at which the computing device came within a wireless communication range of the storage apparatus.

16. The method according to claim 11, wherein the controller copies the content ID transmitted from the computing device to the first memory after the connector is electrically coupled to the electronic apparatus.

17. The method according to claim 16, wherein storage apparatus is an SD card having a wireless communication function and the electronic apparatus has an SD card receptacle having terminals that engage with the connector when the SD card is placed in the SD card receptacle.

18. The method according to claim 17, wherein the computing device and the storage apparatus are configured to communicate with each other using a near-field communication protocol.

19. The method according to claim 18, wherein the electronic apparatus includes an output device to play back the visual or audio content and does not have a nonvolatile memory in which the visual or audio content is stored.

20. The method according to claim 19, wherein the electronic apparatus is a toy apparatus that is worn on a wrist of a person.

* * * * *